(12) United States Patent
Jeong et al.

(10) Patent No.: US 12,524,830 B2
(45) Date of Patent: Jan. 13, 2026

(54) OCCLUSION-AWARE FORWARD WARPING FOR VIDEO FRAME INTERPOLATION

(71) Applicant: QUALCOMM Incorporated, San Diego, CA (US)

(72) Inventors: Jisoo Jeong, San Diego, CA (US); Hong Cai, San Diego, CA (US); Risheek Garrepalli, San Diego, CA (US); Jamie Menjay Lin, San Diego, CA (US); Munawar Hayat, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/499,604

(22) Filed: Nov. 1, 2023

(65) Prior Publication Data
US 2025/0139733 A1    May 1, 2025

(51) Int. Cl.
| | |
|---|---|
| *G06T 3/00* | (2024.01) |
| *G06T 3/18* | (2024.01) |
| *G06T 5/50* | (2006.01) |
| *G06T 7/20* | (2017.01) |

(52) U.S. Cl.
CPC ................. *G06T 3/18* (2024.01); *G06T 5/50* (2013.01); *G06T 7/20* (2013.01); *G06T 2207/20081* (2013.01); *G06T 2207/20084* (2013.01); *G06T 2207/20221* (2013.01)

(58) Field of Classification Search
CPC .... G06T 3/18; G06T 5/50; G06T 7/20; G06T 2207/20081; G06T 2207/20084; G06T 2207/20221; G06T 5/60; G06T 7/269; H04N 19/587
See application file for complete search history.

(56) References Cited

U.S. PATENT DOCUMENTS

| | | |
|---|---|---|
| 2019/0138889 A1 | 5/2019 | Jiang et al. |
| 2020/0160495 A1 | 5/2020 | Staranowicz et al. |

FOREIGN PATENT DOCUMENTS

| | | |
|---|---|---|
| WO | 2021093432 A1 | 5/2021 |

OTHER PUBLICATIONS

Shengyu et al., MaskFlownet: Asymmetric Feature Matching with Learnable Occlusion Mask, pub, IEEE, pub. 2020 (Year: 2020) |.*

(Continued)

*Primary Examiner* — Mekonen T Bekele
(74) *Attorney, Agent, or Firm* — Polsinelli LLP

(57) ABSTRACT

Systems and techniques described herein relate to generating an inter-frame from a first and second frame. An apparatus includes a memory storing a first frame and a second frame; and a processor coupled to the memory and configured to: estimate at least one optical flow between the first frame and the second frame; generate, based on the at least one optical flow, at least one occlusion mask; generate, based on the at least one optical flow and the at least one occlusion mask, at least one weighting mask; generate, based on the at least one optical flow and the at least one weighting mask, at least one inter-frame optical flow; generate, based on the at least one inter-frame optical flow and at least one of the first frame or the second frame, at least one warped frame; and generate, based on the at least one warped frame, an inter-frame.

20 Claims, 21 Drawing Sheets

(56) References Cited

OTHER PUBLICATIONS

International Search Report and Written Opinion—PCT/US2024/045437—ISA/EPO—Nov. 5, 2024.

Jeong J., et al., "OCAI: Improving Optical Flow Estimation by Occlusion and Consistency Aware Interpolation", arxiv.org, Cornell University Library, 201 Olin Library Cornell University Ithaca, NY 14853, Mar. 26, 2024, 15 Pages, XP091711508, The Whole Document.

Niklaus S., et al., "Softmax Splatting for Video Frame Interpolation", 2020 IEEE/CVF Conference on Computer Vision and Pattern Recognition (CVPR), IEEE, Jun. 13, 2020, pp. 5436-5445, XP033803468, The Whole Document.

Shimizu J., et al., "Forward and Backward Warping for Optical Flow-Based Frame Interpolation", 2022 International Conference On Artificial Intelligence in Information And Communication (ICAIIC), IEEE, Feb. 21, 2022, pp. 82-86, XP034095233, The Whole Document.

\* cited by examiner

OCCLUSION-AWARE FORWARD WARPING FOR VIDEO FRAME INTERPOLATION

TECHNICAL FIELD

The present disclosure relates to frame interpolation. For example, aspects of the disclosure relate to systems and techniques for providing occlusion-aware forwarding warping when performing frame interpolation (e.g., video frame interpolation).

BACKGROUND

Interpolation can be used to generate frames. For example, video frame interpolation (VFI) can be used to generate an inter-frame between a first frame at a first time and a second frame at a second time. Interpolated frames (e.g., generated using a VFI algorithm) can be used in many different fields, such as video compression, computer vision, machine learning, among others.

SUMMARY

Systems and techniques for providing occlusion-aware forwarding warping when performing frame interpolation (e.g., video frame interpolation). According to some aspects, an apparatus for processing one or more frames is provided. The apparatus includes one or more memories configured to store a first frame and a second frame and one or more processors coupled to the one or more memories and configured to: estimate at least one optical flow between the first frame and the second frame; generate, based on the at least one optical flow, at least one occlusion mask; generate, based on the at least one optical flow and the at least one occlusion mask, at least one weighting mask; generate, based on the at least one optical flow and the at least one weighting mask, at least one inter-frame optical flow; generate, based on the at least one inter-frame optical flow and at least one of the first frame or the second frame, at least one warped frame; and generate, based on the at least one warped frame, an inter-frame between the first frame and the second frame.

According to some aspects, a method of processing one or more frames is provided. The method includes: estimating at least one optical flow between a first frame and a second frame; generating, based on the at least one optical flow, at least one occlusion mask; generating, based on the at least one optical flow and the at least one occlusion mask, at least one weighting mask; generating, based on the at least one optical flow and the at least one weighting mask, at least one inter-frame optical flow; generating, based on the at least one inter-frame optical flow and at least one of the first frame or the second frame, at least one warped frame; and generating, based on the at least one warped frame, an inter-frame between the first frame and the second frame.

According to some aspects, a non-transitory computer-readable medium is provided having stored thereon instructions which, when executed by one or more processors, cause the one or more processors to be configured to: estimate at least one optical flow between the first frame and the second frame; generate, based on the at least one optical flow, at least one occlusion mask; generate, based on the at least one optical flow and the at least one occlusion mask, at least one weighting mask; generate, based on the at least one optical flow and the at least one weighting mask, at least one inter-frame optical flow; generate, based on the at least one inter-frame optical flow and at least one of the first frame or the second frame, at least one warped frame; and generate, based on the at least one warped frame, an inter-frame between the first frame and the second frame.

According to some aspects, an apparatus is provided that includes: means for estimating at least one optical flow between a first frame and a second frame; means for generating, based on the at least one optical flow, at least one occlusion mask; means for generating, based on the at least one optical flow and the at least one occlusion mask, at least one weighting mask; means for generating, based on the at least one optical flow and the at least one weighting mask, at least one inter-frame optical flow; means for generating, based on the at least one inter-frame optical flow and at least one of the first frame or the second frame, at least one warped frame; and means for generating, based on the at least one warped frame, an inter-frame between the first frame and the second frame.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device or wireless communication device (e.g., a mobile telephone or other mobile device), a wearable device (e.g., a network-connected watch or other wearable device), a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyroscopes or gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
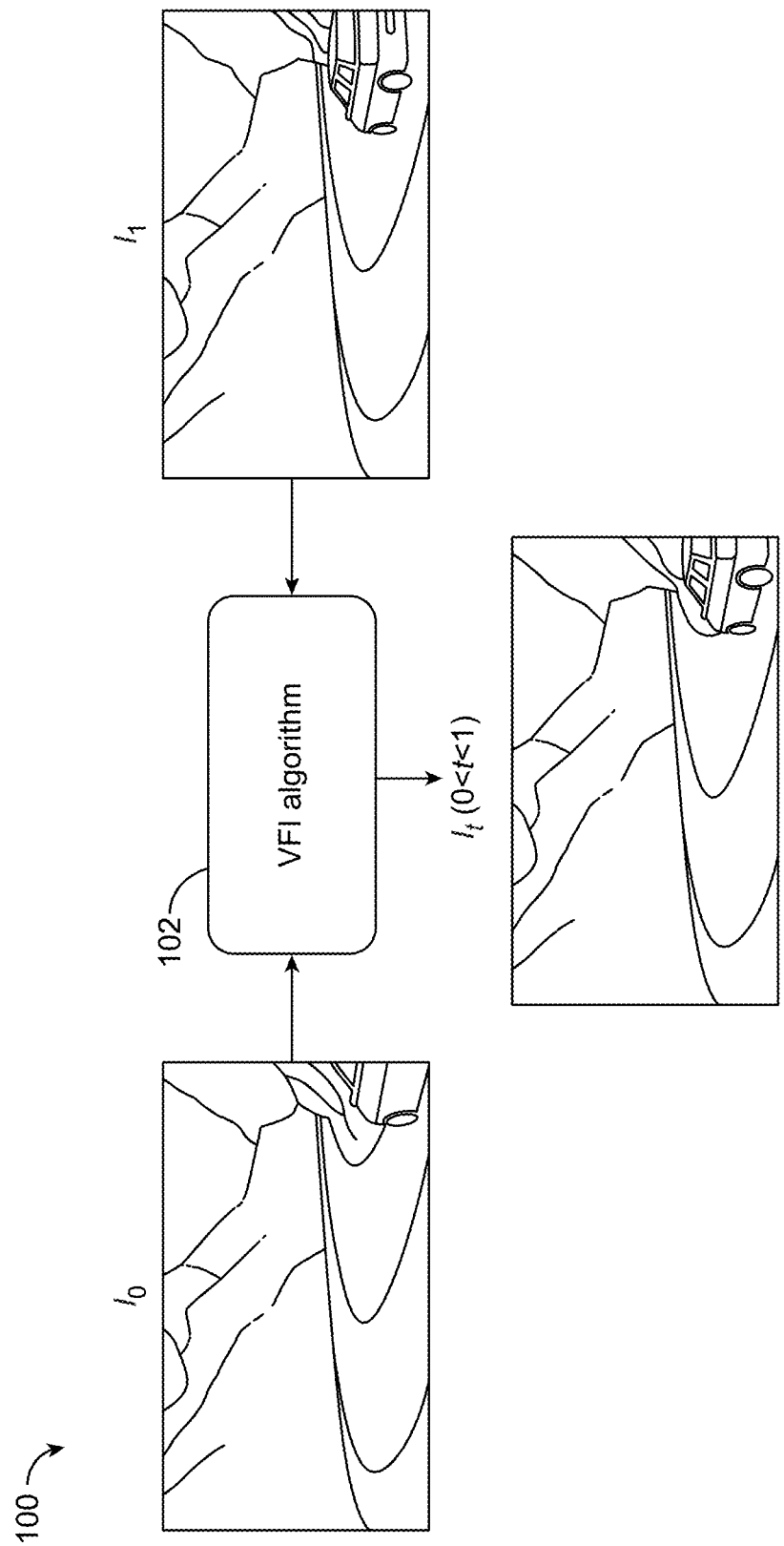
FIG. 1 illustrates the use of a video frame interpolation algorithm, in accordance with aspects of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

As noted previously, interpolation can be used to generate frames. For example, video frame interpolation (VFI) refers to generating an inter-frame $I_t$ between a first image or frame $I_0$ at a time 0 and a second image or frame $I_1$ at time 1. The frames $I_0$ and $I_1$ are time sequential images. The inter-frame $I_t$ is positioned between the frames $I_0$ and $I_1$ ($0<t<1$) (between time 0 and time 1). In the context of video compression, instead of saving, storing, or transmitting all the frame information for all three frames, the inter-frame can be generated by the VFI algorithm.

Interpolated frames (e.g., generated using a VFI algorithm) can be used in many different fields, such as video compression, computer vision, machine learning, among others. In some examples, using a VFI algorithm to generate a reconstructed inter-frame can reduce the amount of residual (e.g., representing the difference) between the reconstructed inter-frame and an original version of the inter-frame. By reducing the residual, the bitrate of a compressed residual can be reduced and thus bandwidth can be saved when transmitting the compressed residual. In some examples, a VFI algorithm can be used to generate higher frame rate video. For example, a VFI algorithm can process 15 frame per second (FPS) video to generate inter-frames, resulting in 30 FPS video, 60 FPS video, or video with a higher frame rate.

Many VFI algorithms utilize backward warping to synthesize or generate inter-frames, such as an inter-frame $I_t$. However, because an inter-frame $I_t$ is invisible, it is not easy to obtain accurate optical flow. To obtain optical flow, such algorithms may rely on machine learning systems (e.g., neural networks) to learn to predict optical flow, such as the optical flow from the inter-frame $I_t$ to a frame at time 0 (frame $I_0$) (referred to as flow $V_{t \to 0}$) and the optical flow from the inter-frame $I_t$ to a frame at time 1 (frame $I_1$) (referred to as flow $V_{t \to 1}$), by utilizing ground-truth optical flows during training (e.g., ground truth inter-frames are available during training). Machine learning model (e.g., neural network model) performance may rely heavily on the training data. However, there can be issues with such machine learning systems, such as due to test data being different from training data (or a training distribution) used to train the machine learning systems. For example, optical flow hallucination (predicting flow without the intermediate image) may not work well when test data is different from training or the time t is different from the training distribution. Backward warping can be easy to compute, but the inter-frame $I_t$ is not present when performing video frame interpolation (in which case the inter-frame $I_t$ is invisible).

In some cases, $V_{0 \to t}$ and $V_{1 \to t}$ can be estimated by assuming motion is linear between t=0 and t=1. To use the two flows $V_{0 \to t}$ and $V_{1 \to t}$ to synthesize $I_t$, forward warping can be performed. Forward warping can be difficult to compute (hard to mapping, ambiguous region). Further, forward warping can result in missing values and/or ambiguous values.

Systems and techniques are described herein that provide a forward-warping-based solution for video frame interpolation. According to some aspects, the systems and techniques can perform occlusion-aware forward warping. The systems and techniques can thus resolve pixel value ambiguity without the need of depth information. For instance, forward warping can be performed to generate optical flow maps from an unseen intermediate frame (also referred to as a inter-frame or middle frame). Missing values can be determined for forward-warped optical flow maps from the unseen intermediate frame. Occlusion handling and generated optical flow maps from the unseen intermediate frame allow the systems and techniques to synthesize the intermediate frame. The systems and techniques can resolve existing issues with forward warping, such as by resolving the ambiguity in pixel values and determining data for missing values.

FIG. 1 illustrates the use of a video frame interpolation algorithm 100, in accordance with aspects of the present disclosure. A first image or frame $I_0$ is shown with a portion of a car driving on a curved street at a first time 0. A second image or frame $I_1$ is shown at time 1 with a more complete view of the car at the later time. A video frame interpolation (VFI) algorithm 102 is shown that generates an interpolated frame $I_t$ that is at a time between time 0 and time 1 or (0<t<1). FIG. 1 shows the general framework for the problem and solution disclosed herein.

Figure 2:
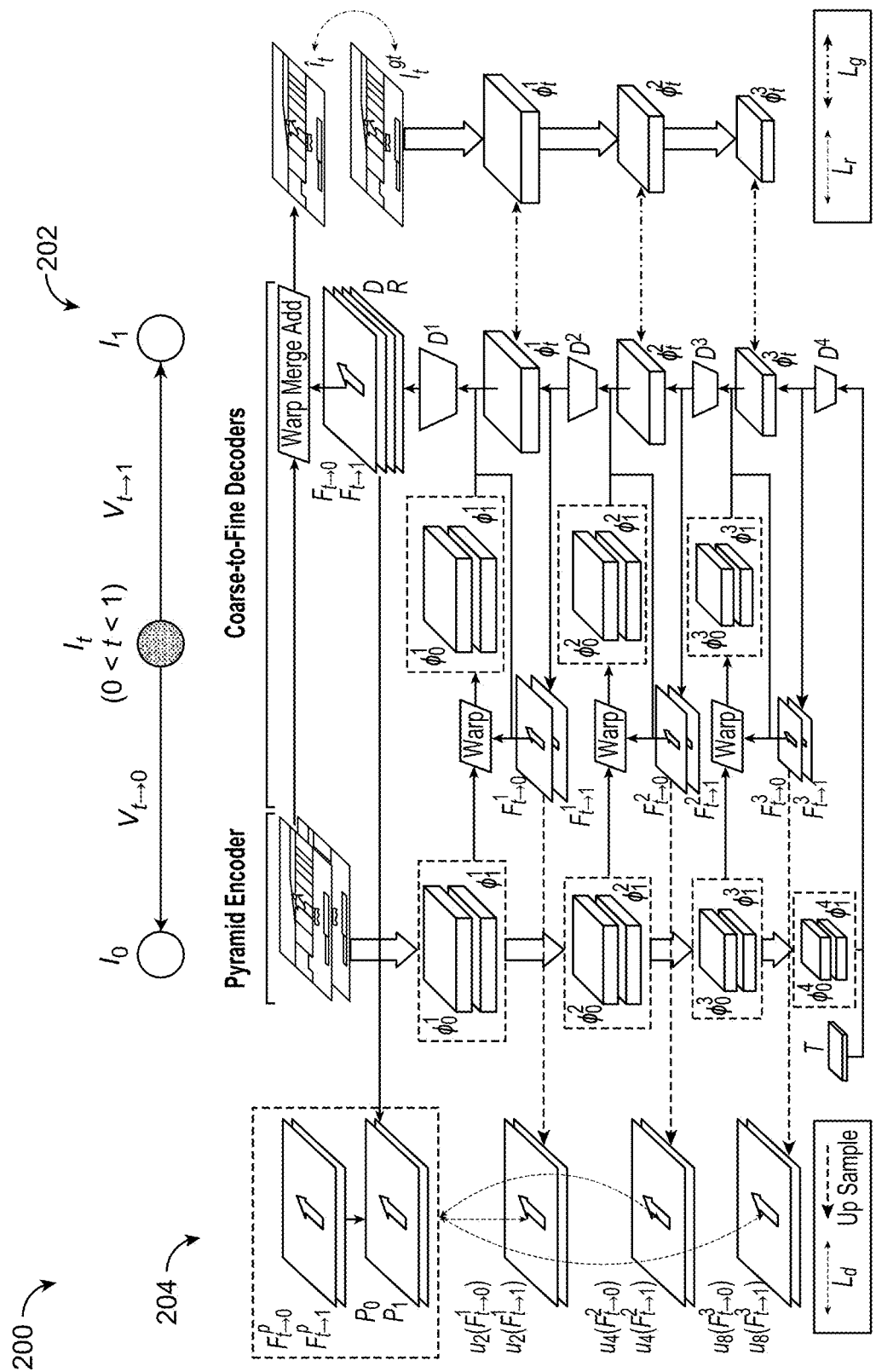
FIG. 2 is a conceptual diagram illustrating conventional algorithms for performing video frame interpolation, in accordance with aspects of the present disclosure.
Figure 2:
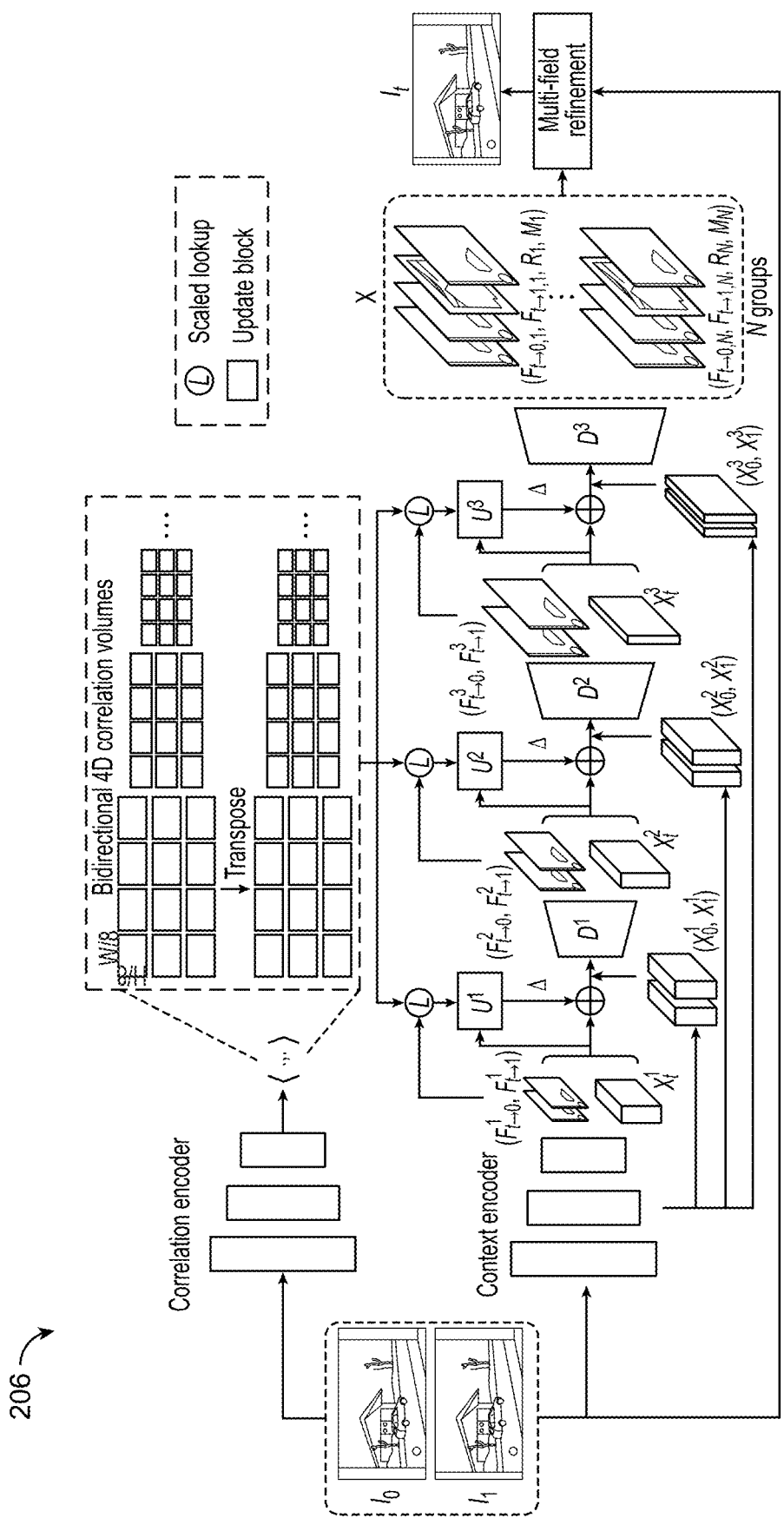

FIG. 2 is a conceptual diagram 200 illustrating an example system for performing video frame interpolation, in accordance with aspects of the present disclosure. Conventional algorithms, such as an intermediate feature refine network (IFRNet) 204 from the Conference on Computer Vision and Pattern recognition (CVPR) 2022 and an All-Pairs Multi-Field Transforms for Efficient Frame Interpolation (AMT) 206 (collectively "VFI algorithms") from CVPR 2023, predict optical flow 202 (shown in FIG. 2 as ($V_{t \to 0}$, $V_{t \to 1}$)) using frames denoted as $I_0$ and $I_1$. The IFRNet 204 and the AMT 206 apply backward warping to synthesize the frame $I_t$. Since the frame $I_t$ is invisible, obtaining an accurate optical flow is difficult. The VFI algorithms rely on the neural network to learn to predict the flows $V_{t \to 0}$ and $V_{t \to 1}$ by utilizing ground-truth flows available during training. In some aspects, having the ground truth means that the ground truth $I_t$ is available at training. The challenge is when performing inference, the system does not have $I_t$ and must use the trained neural network to infer what $I_t$ should be. Typically, the optical flow is predicted from time 0 to time 1. Then, the VFI algorithms applies the warping using original image and the optical flow. After the warping process, the system merges the data so they can generate the inter-frame. At inference, since there is no original $I_t$ image, the system predicts the optical flow from time t to time 0 ($V_{t \to 0}$) and time t to time 1 ($V_{t \to 1}$) and then warps the image.

The IFRNet 204 is shown in general and illustrates the architecture overview and loss functions of the IFRNet 204. The IFRNet 204 is an encoder-decoder-based network which first extracts pyramid context features from input frames with a shared encoder and then gradually refines bilateral intermediate flow fields $F_{t \to 0}$, $F_{t \to 1}$ together with reconstructed intermediate feature $\phi_t$ through coarse-to-fine decoders until yielding the final output. Besides the common image reconstructions loss $L_r$, task-oriented flow distillation loss $L_d$ and feature space geometry consistency loss $L_g$ are newly devised to guide the feature alignment procedure more efficiently towards intermediate frame synthesizing. See, Kong, Lingtong, et al. "Ifrnet: Intermediate feature refine network for efficient frame interpolation" Proceedings of the IEEE/CVF Conference on Computer Vision and Pattern Recognition. 2022, incorporated herein by reference.

The AMT 206 is an architectural overview. The input frames are sent to a correlation encoder to extract features, which re used to construct bidirectional correlation volumes. Then, the context encoder extracts pyramid features of visible frames and generates initial bilateral flows and interpolated intermediate features. Next, the algorithm uses bilateral flows to retrieve bidirectional correlations for jointly updating flow fields and the intermediate feature at each level. Finally, the algorithm generates multiple groups of flow fields, occlusion masks and residuals based on the coarse estimate for interpolating the intermediate frame. See Li, Zhen, et al. "AMT: All-Pairs Multi-Field Transforms for Efficient Frame Interpolation." Proceedings of the IEEE/CVF Conference on Computer Vision and Pattern Recognition. 2023, incorporated herein by reference.

Model performance relies heavily on the training data. Such optical flow hallucination (i.e., predicting flow without the intermediate image) will not work well when test data is very different from training or t is different from training distribution.

Figure 3:
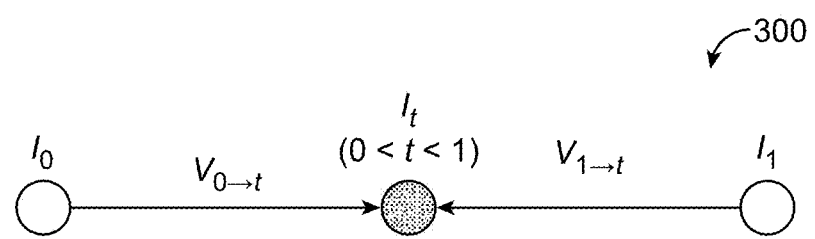
FIG. 3 illustrates an approach to performing video frame interpolation, in accordance with aspects of the present disclosure.

FIG. 3 illustrates an approach to performing video frame interpolation, in accordance with aspects of the present disclosure. Note that the series of frames 300 includes a first frame $I_0$ and a first time 0, a second frame $I_1$ and a second time 1 and an intermediate frame $I_t$ at time t between time 0 and time 1. The conventional VFI algorithms shown in FIG. 2 predict optical flow ($V_{t \to 0}$, $V_{t \to 1}$) using $I_0$ and $I_1$ images. Such VFI algorithms apply backward warping to synthesize $I_t$.

As shown in FIG. 3, one can estimate the optical flows $V_{0 \to t}$ and $V_{1 \to t}$, e.g., by assuming motion is linear between t=0 and t=1. To use these two flows to synthesize $I_t$, one needs to perform forward warping.

Figure 4:
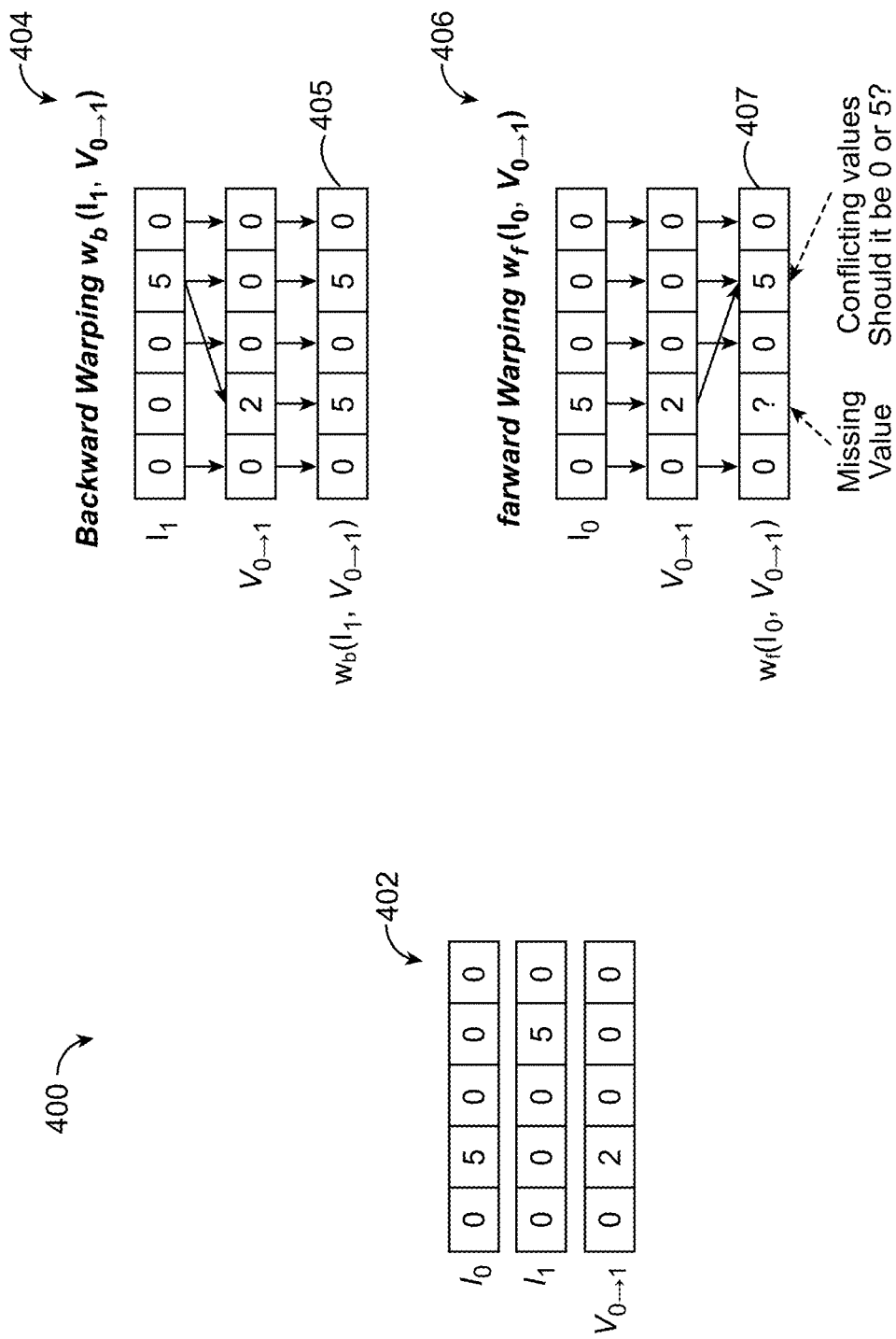
FIG. 4 is a conceptual diagram illustrating a comparison of backward warping versus forward warping in video frame interpolation, in accordance with aspects of the present disclosure.

FIG. 4 is a conceptual diagram 400 illustrating a comparison of backward warping versus forward warping in video frame interpolation, in accordance with aspects of the present disclosure. The pixel data 402 represents the optical flow from the data at time 0 to time 1. Here, the initial frame $I_0$ at time 0 has pixel data 0, 5, 0, 0, 0 and the final frame $I_1$ at time 1 has pixel data 0, 0, 0, 5, 0. The optical flow $V_{0 \to 1}$ from 0 to 1 is known to be 0, 2, 0, 0, 0. From the pixel data, the frame $I_t$ can be computed. However, the intermediate image is not present when doing video frame interpolation. The numbers represent pixels in an image and the movement of, for example, the number 5 from $I_0$ to $I_1$ represents the movement of a pixel in the image from one location to the next over time. The pixel data 402 shows how some pixels show no change from the time 0 to the time 1 such as the "0" values in the first, third, and fifth columns or positions of data shown in the pixel data 402.

When performing backward warping $w_b(I_1, V_{0 \to 1})$ 404, the goal is to generate the first image or frame $I_0$ from the second image $I_1$ and the optical flow data $V_{0 \to 1}$. The idea is "backward" warping in the sense that the flow is from time 0 to time 1, but the prediction being made is to determine the first frame $I_0$ based on the second frame $I_1$ and the optical frow data $V_{0 \to 1}$. For backward warping $w_b(I_1, V_{0 \to 1})$ 404, the frame $I_1$ at time 1 has pixel data (as example data) 0, 0, 0, 5, 0 which is used with the optical flow 0, 2, 0, 0, 0 ($V_{0 \to 1}$) to generate $w_b(I_1, V_{0 \to 1})$ or the backward warping pixel data 405 representing $I_1$. The value of "5" in the fourth column or position of the frame $I_1$ is accessed via the optical flow data $V_{0 \to 1}$ (0, 2, 0, 0, 0) to be 5 in the second column and also 5 in the fourth column of the backward warping pixel data 405 through what is called a ghosting effect. The 5 in the fourth column of the backward warping pixel data 405 can also be obtained by using occlusion information related to the "0" in the fourth column of the optical flow data $V_{0 \to 1}$ (0, 2, 0, 0, 0). Note that the "0" values in the first, third, and fifth columns transfer directly as pixel values to the backward warping pixel values of 0, 5, 0, 5, 0 (405).

The forward warping $w_f(I_0, V_{0\to1})$ 406 is difficult to compute. Forward warping involves using the initial frame $I_0$ 0, 5, 0, 0, 0 and the optical flow data $V_{0\to1}$ 0, 2, 0, 0, 0 to calculate $I_1$. In this case, when processing the data, the values in the first, third and fifth columns of the forward warping pixel data are clearly all "0" values. However, there is a missing value in the second column of the forward warping pixel data 407 representing $I_0$ and a conflicting value in the fourth column with respect to whether that value should be 0 or 5. FIG. 4 shows how $i_t$ is difficult to compute or hard to map using forward warping given the ambiguous region and missing values in the forward warping pixel data 407. In some examples, if the flow is a factional value, then it is difficult to map as well. By applying the interpolation approach disclosed herein, one can resolve the issues with both missing value and conflicting values as shown in FIG. 4.

Figure 5:
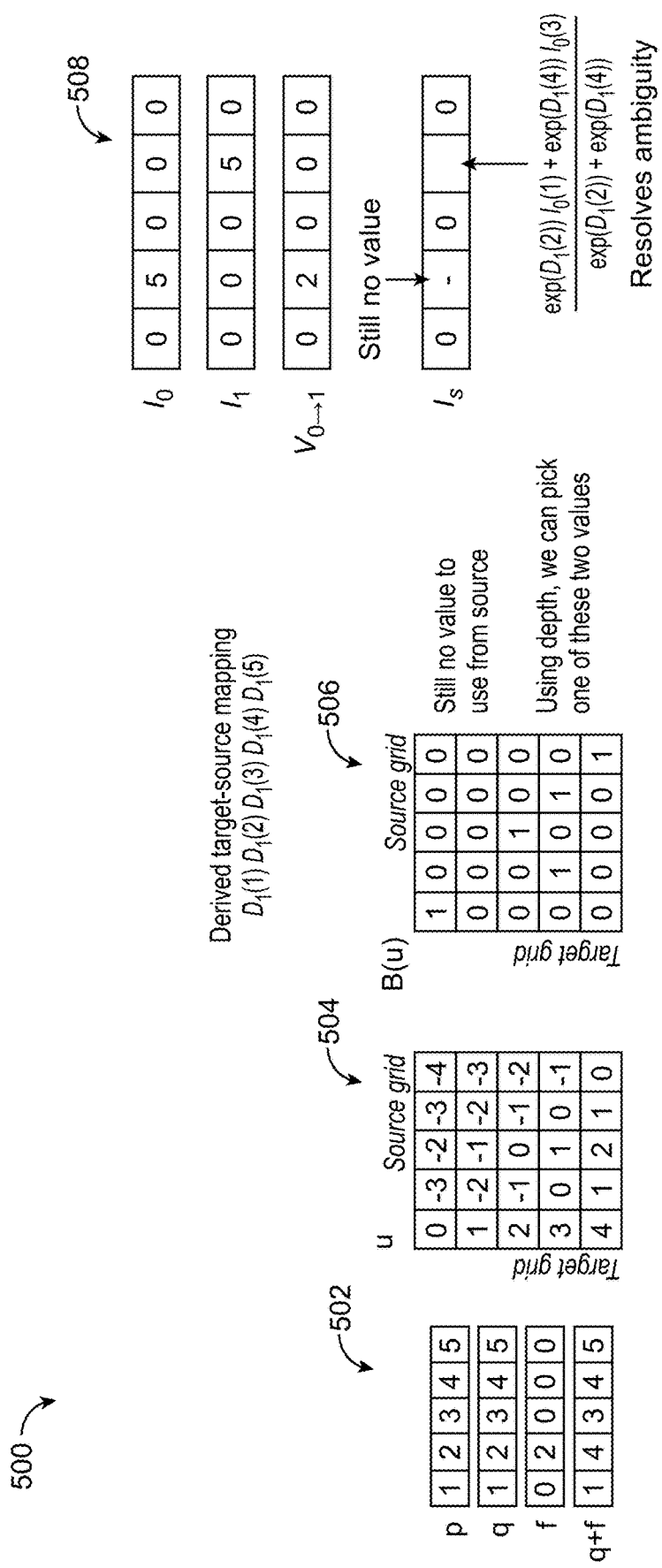
FIG. 5 illustrates how to resolve ambiguity in data when performing video frame interpolation, in accordance with aspects of the present disclosure.

FIG. 5 further illustrates an example of the use of the forward warping algorithm 500. The forward warping algorithm requires a relatively large amount of memory to compute. In some cases, compute unified device architecture (CUDA) coding has been implemented to perform forward warping, which enables the computing system to leverage parallel computing technologies such as using graphics processing unit (GPU) on the computing system as well as a traditional central processing unit (CPU).

In each pixel, one approach or algorithm finds the all-correspondence pixels and combines them using depth information to resolve ambiguity or conflicting values (e.g., one object is in front of another in the same 2D pixel location). In this case, mono-depth is not that accurate and requires extra computation.

The following are equations used for forward warping:

$$\text{let } u = p - (q + F'_{1\to2}(q)),$$

$$b(u) = \max(0, 1 - |u_x|) \cdot \max(0, 1 - |u_y|),$$

$$I_s(p) = \frac{\sum_q \exp D_1(q) \cdot I_1(q) \cdot b(u)}{\sum_q \exp D_1(q) \cdot b(u)},$$

Here, p refers to a target grid, q refers to a source grid, and f or F' refer to an optical flow. First pixel data 502 shows the target grid data p 1, 2, 3, 4, 5, the source grid data q 1, 2, 3, 4, 5, the optical flow f 0, 2, 0, 0, 0 and the addition of q+f 1, 4, 3, 4, 5.

The grid u 504 represents a computation of the difference between the target grid data p and the summation value of q+f. In the grid u 504, the first row is 0, 0 −3, −2, −3, −4 which results from the first value 1 of the target grid data p 1, 2, 3, 4, 5 minus each respective value of q+f which is 1, 4, 3, 4, 5 to generate 0, −3, −2, −3, −4. The second row of the grid u 504 represents the second value 2 of the target grid data p minus respective value of q+f which is 1, 4, 3, 4, 5 to generate 1, −2, −1, −2, −3, and so forth to fill out the grid u 504. With the value of the grid u 504, one can apply the b (u) equation above using the grid u 504 values. The b (u) equation is used to determine which pixels have correspondence between a respective target value and a respective source grid value. The B(u) grid 506 shows in the first row and first column a value of 1 indicating the result of the equation b (u) showing correspondence in that location between the target grid and the source grid. In the second row, there are no "1" values thus indicating no correspondence. In the third row and third column, there is a 1 indicating correspondence. In the fourth row, second and fourth columns, there are "1" values indicating conflicting correspondence. The approach can use depth information to pick one of those two values. The fifth row, fifth column includes a 1 indicating correspondence.

In the fourth row of the B(u) grid 506, the approach can include predicting the depth information using a mono-depth estimation model. One can assume that close objects to a camera should be more dominant. So, the system predicts the depths or may predict inverse depths $D_1(1) D_1(2) D_1(3) D_1(4) D_1(5)$ resulting in closer objects having a relatively higher value. In some aspects, assume that the value of 5 in the pixel data 508 represents a car in the foreground of an image. In this case, if the car moves to the right and other data (the 0') represent the background, the car would be closer to the camera than the background. The algorithm would give more weight to the value 5 representing the car. Thus, in the pixel data 508, the resulting $I_s$ pixel data (the forward warped image) still has no value in the second column because there is no correspondence indicated from the B(u) grid 506, second row. But applying the $I_s(p)$ equation above resolves the ambiguity in the fourth column of $I_s$ by using the depth information and providing extra weight to the second column position of the fourth row of B(u) grid 506 (the 1 in the second column, fourth row is weighted more than the 1 in the fourth column, fourth row) providing the proper result. In other words, the 5 value in the second column of the $I_0$ pixel data is given a higher weighting and thus when the 5 moves to the right from $I_0$ to $I_1$, then when it is in the fourth column, its value is given a higher weighting and thus used for the fourth column of $I_s$.

Note that in the B(u) grid 506, that the first row, first column having a 1 indicates correspondence between the source grid and the target grid at that position. Thus, in the pixel data 508, the first column of data being 0 and 0 for $I_0$ and $I_1$ respectively, that the 0 value thus carries to the $I_s$ first column. The 1 in the third row, third column of B(u) 506 indicates correspondence between the third column of $I_0$ and $I_1$ respectively, that the 0 value thus carries to the $I_s$ third column. Similarly, 1 in the fifth row, fifth column of B(u) 506 indicates correspondence between the fifth column of $I_0$ and $I_1$ respectively, that the 0 value thus carries to the $I_s$ fifth column. The unknown value of the second column of $I_s$ remains because there is no correspondence shown in B(u) 506 for that column.

Since the fourth row of B(u) 506 has two "1" values, the $I_s(p)$ equation above is operative to make an occluding pixel dominant in the analysis.

Figure 6:
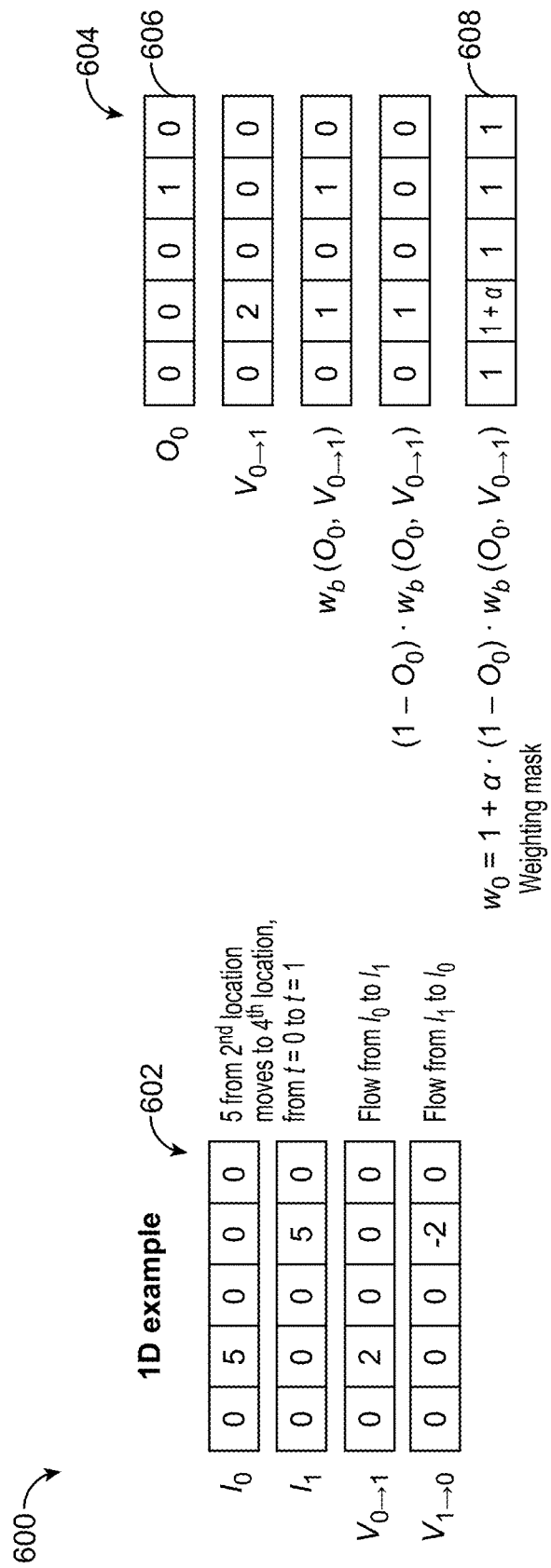
FIG. 6 illustrates an example of resolving ambiguity in a pixel value when performing video frame interpolation, in accordance with aspects of the present disclosure.

Performing a mono-depth calculation is not that accurate and requires extra computation. FIG. 6 illustrates a proposed solution 600 in which an occlusion-aware forward warping approach is provided. A pixel that is not occluded but is one that creates the occlusion of other pixels is likely closer to the camera than the occluded pixels. The approach involves using a forward backward consistency-based occlusion mask.

A one-dimensional example 602 shows the first image $I_0$ being 0, 5, 0, 0, 0 and the second image being 0, 0, 0, 5, 0 with a flow from $I_0$ to $I_1$ $V_{0\to1}$ being 0, 2, 0, 0, 0 and a flow from $I_1$ to $I_0$ $V_{1\to0}$ being 0, 0, 0, −2, 0. $I_0$. The value of "2" in $V_{0\to1}$ being 0, 2, 0, 0, 0 represents the movement of the value 5 from the second position in $I_0$ to the fourth position in $I_1$. However, in the reverse direction for the $V_{1\to0}$ being 0, 0, 0, −2, 0, the "−2" would represent the movement of the value of "5" from the fourth position to the second position in the negative or left direction. Thus, in the optical flow $V_{1\to0}$, the corresponding value is −2.

The generate an occlusion mask, the following example equation can be used:

$$\left|\hat{V}^f(x) + \hat{V}^b(x + \hat{V}^f(x))\right|^2 < \gamma_1 \left(\left|\hat{V}^f(x)\right|^2 + \left|\hat{V}^b(x + \hat{V}^f(x))\right|^2\right) + \gamma_2$$

The occlusion mask $O_0$ shown in pixel data 604 can be generated based on forward-backward consistency as described in Jeong, Jisoo, et al. "Distractflow: Improving optical flow estimation via realistic distractions and pseudo-labeling", Proceedings of the IEEE/CVF Conference on Computer Vision and Pattern Recognition, 2023, incorporated herein by reference. $V^f$ and $V^b$ can represent predicted forward and backward flows, the value $Y_1$ and $Y_2$ can represent constants such as, for example, 0.01 and 0.5 respectively. Other values are included within the scope of this disclosure as well. In general, the approach of the equation above is to determine if the forward and backward flow predictions meet the constraint of the equation and if so, then it can be assumed that the prediction is accurate and the output can be a 1. Otherwise, the output would be a 0. The "x" value is the respective values of 0, 2 or −2 in the forward optical flow $V^f(V_{0\rightarrow 1})$ or the backward optical flow $V^b(V_{1\rightarrow 0})$ for each of the five positions shown by way of example. The equation illustrates one example way of determining forward-backward consistency as other equations can be implemented to determine the consistency between both the predictions.

The equation above is applied to both the forward flow $V_{0\rightarrow 1}$ and the backward flow $V_{1\rightarrow 0}$ to obtain the set of values for the occlusion mask $O_0$ as values 0, 0, 0, 1, 0. The pixel data 604 then shows a series of operations as follows.

The forward flow $V_{0\rightarrow 1}$ having values of 0, 2, 0, 0, 0 is shown in FIG. 6. A backward warping is applied using the forward flow $V_{0\rightarrow 1}$ and the occlusion mask $O_0$ 606 is used to obtain $w_b(O_0, V_{0\rightarrow 1})$ resulting in the values: 0, 1, 0, 1, 0. Note that the backward warping is similar to the backward warping 404 shown in FIG. 4. Then the system can apply $(1-O_0)*w_b(O_0, V_{0\rightarrow 1})$ on a pixel-by-pixel basis to obtain the values 0, 1, 0, 0, 0. The values 0, 1, 0, 0, 0 represent which position in the data should be weighted. The application of $(1-O_0)*w_b(O_0, V_{0\rightarrow 1})$ represents a warped occlusion mask using backward warping. The occlusion moves from the fourth column or fourth location to the second location in the operation. A weighting mask 608 can be generated and applied as $w_0=1+\sigma*(1-O_0)*w_b(O_0, V_{0\rightarrow 1})$, where $\sigma$ can be a value such as a hyperparameter or other value to obtain the values 1, 1+σ, 1, 1, 1. Note that the weighting is applied to the second position of the weighting mask 608. Since the occlusion indicates an object closer to the camera, it is preferred to use its corresponding pixel value in warping. Thus, the pixel value in the second location or column is given a larger weight as shown.

Note that the position of the 1+σ value in the weighting mask 608 is based on the processing of the occlusion mask $O_0$ 606 which references with the value of 1 that there is an occlusion in the corresponding location and then through the backwards warping process is used to identify which position to provide the extra weighting.

Figure 7:
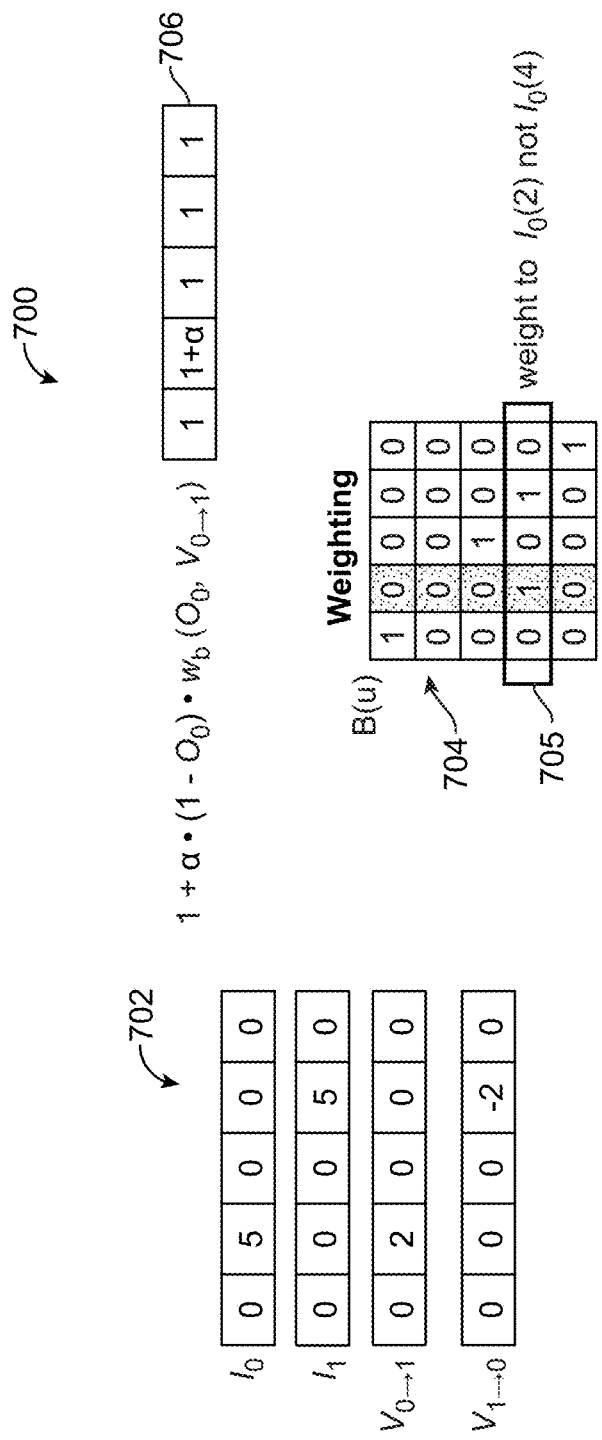
FIG. 7 illustrates an example of resolving ambiguity in a pixel value when performing video frame interpolation, in accordance with aspects of the present disclosure.

FIG. 7 illustrates an approach to resolving ambiguity at a pixel value 700. Pixel data 702 is shown for the first image $I_0$ as 0, 5, 0, 0, 0 and the second image as 0, 0, 0, 5, 0 with an optical flow from $I_0$ to $I_1$ $V_{0\rightarrow 1}$ being 0, 2, 0, 0, 0 and an optical flow from $I_1$ to $I_0$ $V_{1\rightarrow 0}$ being 0, 0, 0, −2, 0. A weighting mask 706 is shown for $w_0=1+\sigma*(1-O_0)*w_b(O_0, V_{0\rightarrow 1})$ with values 1, 1+6, 1, 1, 1. The weighting mask 706 is used to resolve ambiguity without requiring depth information. In the B(u) grid 704, since the second location corresponds to an object closer to the camera, the system uses it values instead of the one in the fourth location. The system adds a weight to $I_0(2)$ and not $I_0(4)$. As indicated by the second column being highlighted in B(u) 704, the values in the second column have the added weight per the weighting mask 706. While the weighting is shown for the entire column in the second column of B(u) 704, the fourth row 705 of B(u) 704 has a conflict where there are two values in the row. Due to the two values being included in the fourth row 705, the weight is applied to the fourth row 705. The other rows do not exhibit such a conflict (where there are two values to choose from), in which case the weighting is not needed in those rows.

Figure 8:
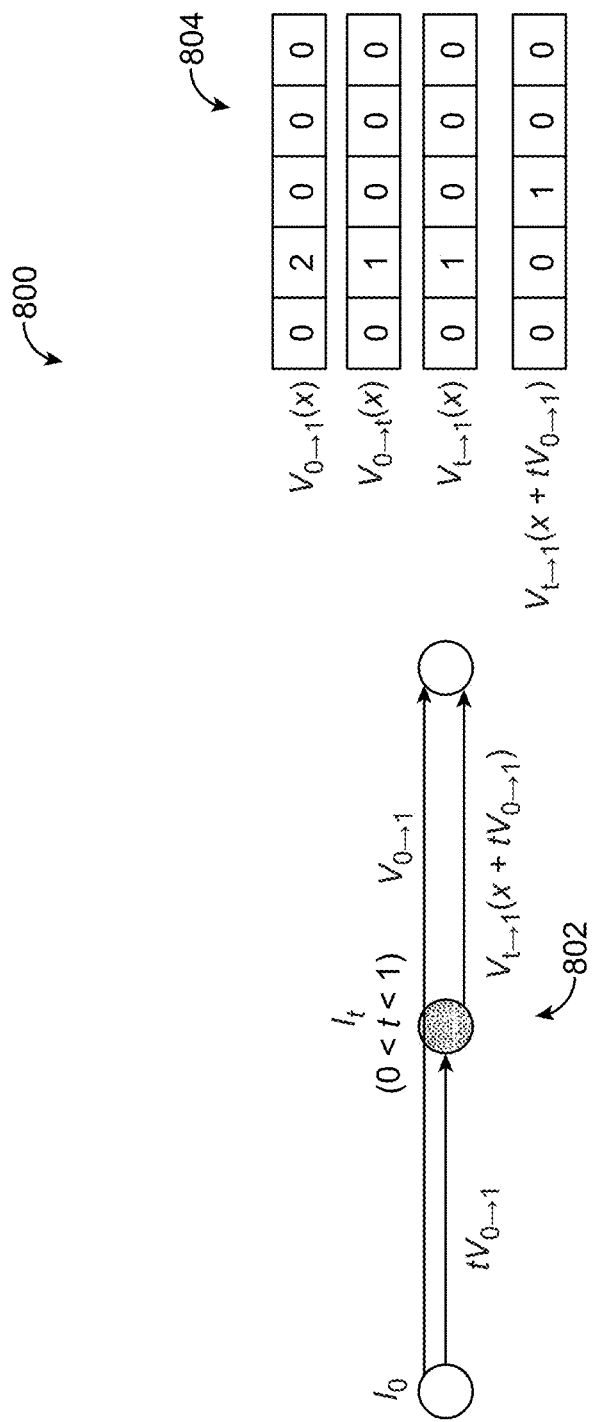
FIG. 8 illustrates an example of resolving a missing value of a pixel when performing video frame interpolation, in accordance with aspects of the present disclosure.

FIG. 8 illustrates an approach to resolving a missing value 800. One can apply a forward warping to an optical flow map. Image representations 802 show a first image $I_1$, an intermediate image $I_t$ and a second image $I_0$. A forward optical flow $V_{0\rightarrow 1}$ is shown. The forward optical flow $V_{0\rightarrow 1}$ equals or can be broken down into a first optical flow $tV_{0\rightarrow 1}$ from time 0 to time 1 (time the value t) plus a second optical flow $V_{t\rightarrow 1}(x+tV_{0\rightarrow 1})$ from time t to time 1. Some optical flow algorithms predict the optical flow in ⅛ resolution and upsample the optical flow. Forward warping might be applied in ⅛ resolution to optical flow which is very efficient. The original forward warping requires a large amount of memory. However, by performing optical forward flow at ⅛ resolution, one can greatly reduce in forward warping the amount of memory required.

In some aspects, one can implement the disclosed approach using Matrix Multiplication in PyTorch. Using Matrix Multiplication eliminates the need for a dedicated CUDA implementation.

When calculating the optical flows mentioned above for FIG. 8, one can use the following:

$$V_{0\rightarrow 1}(x) = V_{0\rightarrow t}(x) + V_{t\rightarrow 1}(x + V_{0\rightarrow t})$$

$$\text{Assume } V_{0\rightarrow t} \Rightarrow t \; V_{0\rightarrow 1}$$

$$V_{0\rightarrow 1}(x) = t \; V_{0\rightarrow 1} + V_{t\rightarrow 1}(x + tV_{0\rightarrow 1})$$

$$V_{t\rightarrow 1}(x + tV_{0\rightarrow 1}) = (1-t)V_{0\rightarrow 1}(x)$$

$$\text{Or, } V_{t\rightarrow 1}(x) = w_f((1-t)V_{0\rightarrow 1}(x), tV_{0\rightarrow 1})$$

The term $(x+t \; V_{0\rightarrow 1})$ is a warping value in the process. The term $w_f((1-t) \; V_{0\rightarrow 1}(x), tV_{0\rightarrow 1})$ involves applying a forward warping operation to obtain the optical flow from time t to time 1 and based on the optical flow from time 0 to time 1 (which is $tV_{0\rightarrow 1}$) as shown in FIG. 8. The approach is to decompose $V_{0\rightarrow t}$ and $V_{t\rightarrow 1}$ into different terms. The argument in $V_{t\rightarrow 1}$ comes from the pixel movement from time 0 to time t. The above equations enable one to obtain $V_{t\rightarrow 1}$. Once can then calculate $V_{t\rightarrow 0}$ by using $V_{1\rightarrow 0}$. However, there is still a need to fill in missing values.

Pixel data 804 shows the various stages of calculating optical flows for $V_{0\rightarrow 1}(x)$ which is 0, 2, 0, 0, 0; $V_{0\rightarrow t}(x)$ which is 0, 1, 0, 0, 0; $V_{t\rightarrow 1}(x)$ which is 0, 1, 0, 0, 0 and $V_{t\rightarrow 1}(x+tV_{0\rightarrow 1})$ which is 0, 0, 1, 0, 0.

Figure 9:
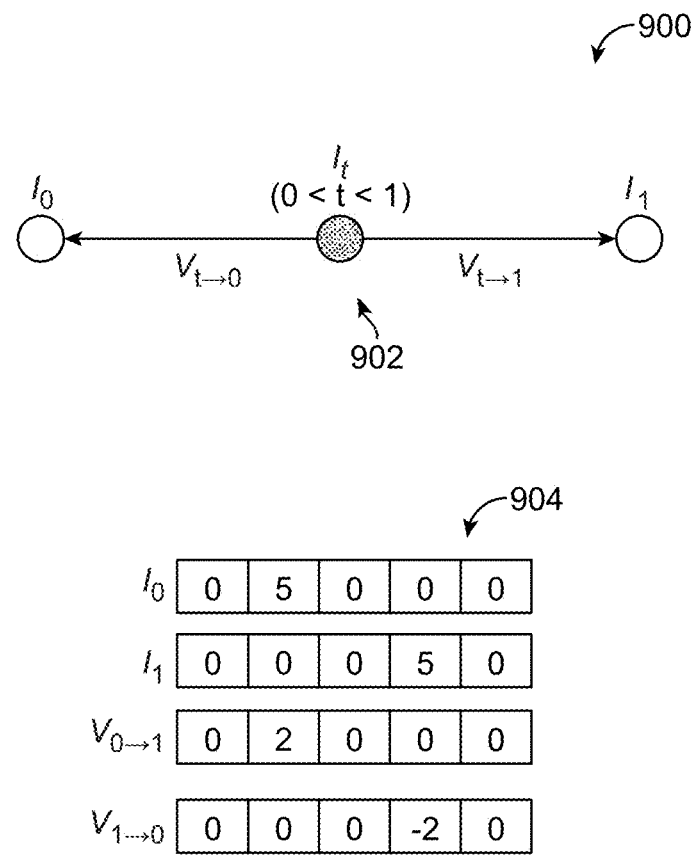
FIG. 9 illustrates an example of resolving a missing value of a pixel when performing video frame interpolation, in accordance with aspects of the present disclosure.

FIG. 9 illustrates images and image data 900 including a set of frames 902 showing a first optical flow $V_{t\rightarrow 0}$ and a second optical flow $V_{t\rightarrow 1}$. These optical flows are in the opposite direction as shown. If one were to combine these two flows, the result would simply be zero. A set of pixel data 904 (including pixel values) data is shown as well.

Since there are missing values in $V_{t \to 0}$ and $V_{t \to 1}$, due to forward warping, for each optical flow map, one can complete the empty pixels using values from the other map. In this example, one can generate two optical flows ($V_{t \to 0}$, $V_{t \to 1}$) using forward warping. In the process, one can assume that $tV_{t \to 1} = -(1-t) V_{t \to 0}$.

Figure 10:
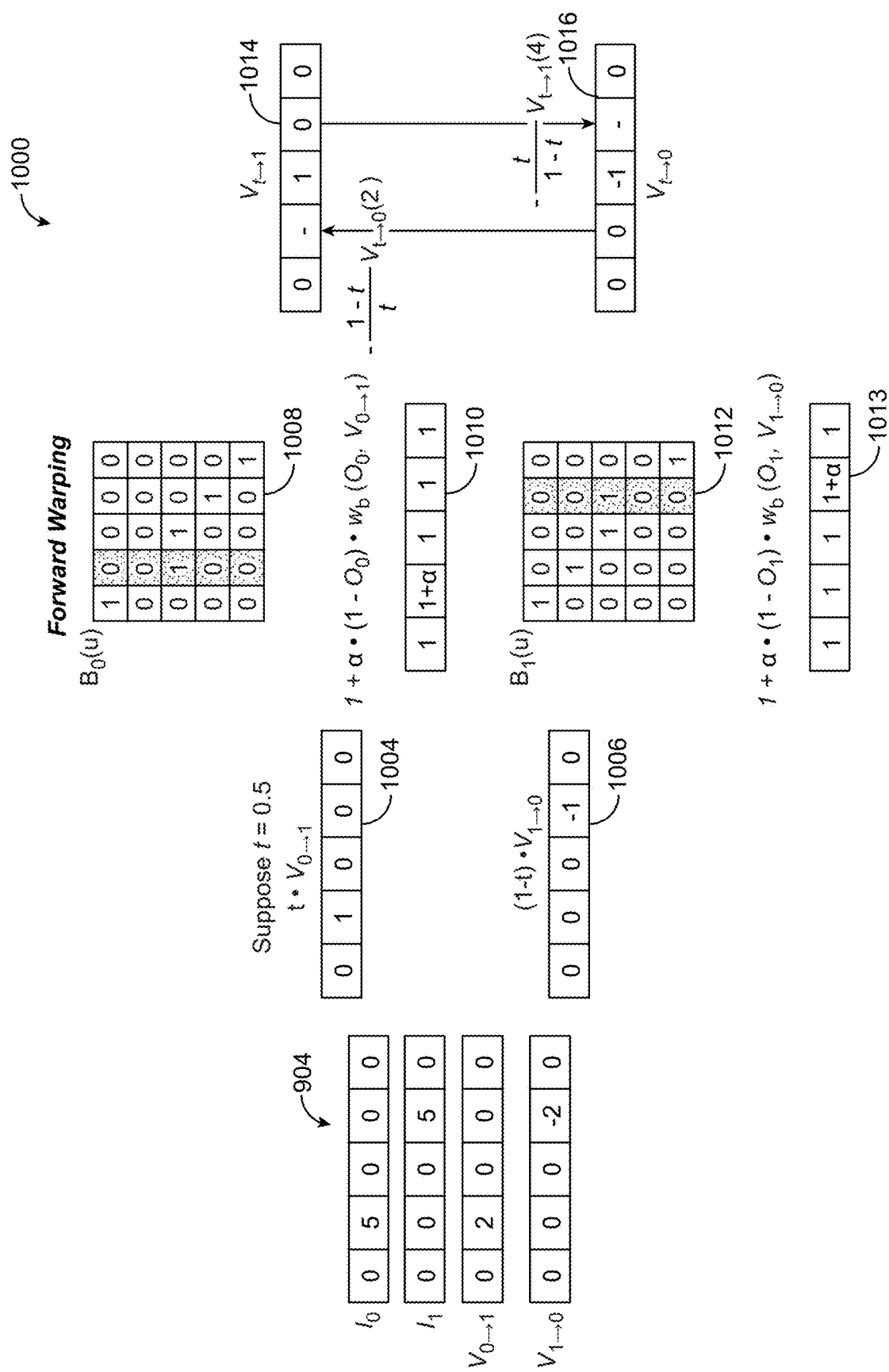
FIG. 10 illustrates an example of resolving a missing value of a pixel when performing video frame interpolation, in accordance with aspects of the present disclosure.

FIG. 10 illustrates a solution to resolving missing values in optical flows (e.g., missing values in $V_{t \to 0}$ and $V_{t \to 1}$). For example, when generating a forward warping using the grid $B_0(u)$ 1008, there is a need to fill in missing values. The pixel data 904 from FIG. 9 is provided as input to determine the missing values. The missing values can be determined based on the assumption that $tV_{t \to 1} = -(1-t) V_{t \to 0}$, as shown in the pixel data for optical flow 1014 (denoted as $V_{t \to 1}$) and the pixel data for the optical flow 1016 (denoted as $V_{t \to 0}$).

Assuming that t=0.5, the approach can include multiplying 0.5 by the optical flow $V_{0 \to 1}$ from the set of pixels of the pixel data 904 which results in the pixel values 0, 1, 0, 0, 0 (1004). Multiplying (1-0.5) by the optical flow $V_{1 \to 0}$ from the set of pixels of the pixel data 904 results in the pixel values 0, 0, 0, −1, 0 (1006). Based on the pixels 1004 once can obtain a first weighting mask 1010. Note that the second position in the weighting mask 1010 has the additional weighting value σ. Based on the pixels 1006, a second weighting mask 1013 can be determined. Note that the second weighting mask 1013 has the additional weighting value σ in the fourth position.

For the grid $B_0(u)$ 1008, the forward warping process is as follows given the first weighting mask 1010. The first row and the first column have a value of 1 (indicating correspondence) but with the optical flow and the pixels 1004, the value would be zero in the first position of the optical flow $V_{t \to 1}$ 1014. The second row and second column of $B_0(u)$ 1008 have all zeros (and thus meaning there is no correspondence) and thus the second position of the optical flow $V_{t \to 1}$ 1014 will be missing. The third row of $B_0(u)$ 1008 has two conflicting values of 1 in the second and third rows and thus the weighting mask 1010 indicates to add weight to the second position, resulting in the value of 1 in the optical flow $V_{t \to 1}$ 1014 in the third position. The fourth row of $B_0(u)$ 1008 includes a 1 in the fourth position which leads to a zero in the optical flow $V_{t \to 1}$ 1014 and the fifth row, fifth column of $B_0(u)$ 1008 has a 1, resulting in a zero value in the fifth position of the optical flow $V_{t \to 1}$ 1014.

A similar process of forward warping for $B_1(u)$ 1012 can be applied to use the second weighting mask 1013 to generate the optical flow $V_{t \to 0}$ 1016 with a missing value in the fourth position based on the fourth row of $B_1(u)$ 1012 showing no correspondence.

To fill in the missing values, one can use the optical flow $V_{t \to 1}$ 1014 in which the fourth position which is a 0 is used to generate a value for the fourth position of the optical flow $V_{t \to 0}$ 1016 using an equation such as $-(t/(1-t))*V_{t \to 1}$ (4) or $-(0.5/(-0.5))*0$ which would be 0. To generate the missing value in the second position of the optical flow $V_{t \to 1}$ 1014, one can use the second position of the optical flow $V_{t \to 0}$ 1016 as follows: $-((1-t)/t)*V_{t \to 0}$ (2) which can be—$(-0.5/0.5)*0$ which results in 0.

Figure 11:
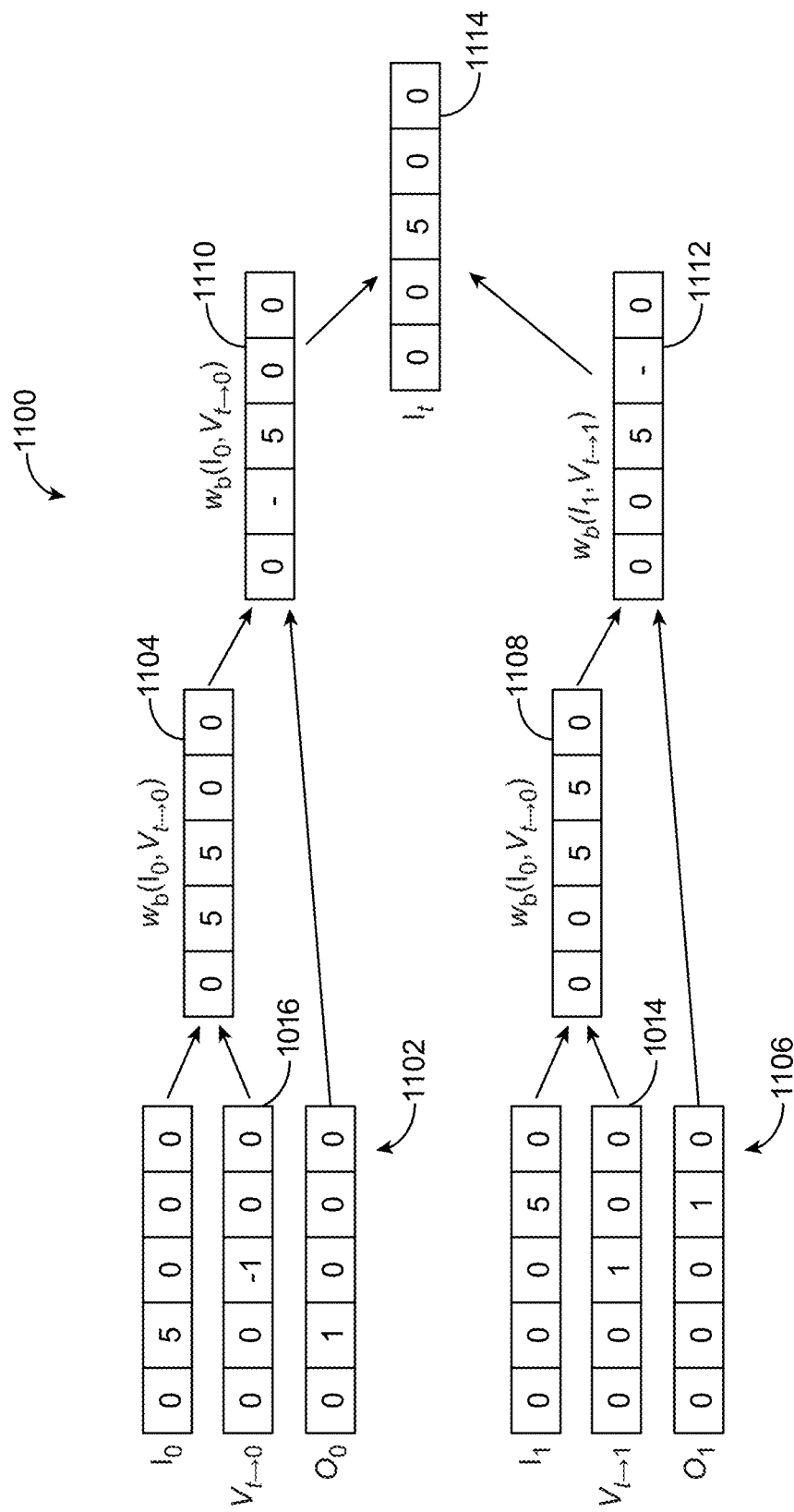
FIG. 11 illustrates an example of applying backward warping and using occlusion information when performing video frame interpolation, in accordance with aspects of the present disclosure.

The optical flow $V_{t \to 0}$ 1016 with values 0, 0, −1, 0, 0 and the optical flow $V_{t \to 1}$ 1014 with values 0, 0, 1, 0, 0 can now be used to generate the inter-frame $I_t$. FIG. 11 is a diagram illustrating a fusing process 1100 that operates on a first set of data 1102 including pixel data for frame $I_0$, optical flow $V_{t \to 0}$ 1016, and an occlusion mask $O_0$. The process 1100 includes applying a backwards warping process and using occlusion information from the occlusion mask $O_0$ to fuse two warped images to generate a final interpolated intermediate frame 1114 (or inter-frame or middle frame).

A second set of data 1106 includes pixel data for $I_1$, optical flow $V_{t \to 1}$ 1014 and an occlusion mask $O_1$. The image $I_0$ and the optical flow $V_{t \to 0}$ 1016 are used to generate a first backward warped image 1104 with values 0, 5, 5, 0, 0. The image $I_1$ and the optical flow $V_{t \to 1}$ 1014 are used to generate a second backward warped image 1108 with values 0, 0, 5, 5, 0. The occlusion mask $O_0$ is used with the first backward warped image 1104 to generate a first set of pixels 1110 with values 0, 5, 0, 0 (with the second value missing). The occlusion mask $O_1$ is used with the second backward warped image 1108 to generate a second set of pixels 1112 with values 0, 0, 5, and 0 (with the fourth value missing). Because the occlusion mask $O_0$ indicates that the second position of the first set of pixels 1110 can be ignored and the occlusion mask $O_1$ indicates that the fourth position of the second set of pixels 1112 can be ignored, the system can fuse the first set of pixels 1110 and the second set of pixels 1112 to arrive at an inter-frame 1114 having values 0, 0, 5, 0, 0.

Figure 12:
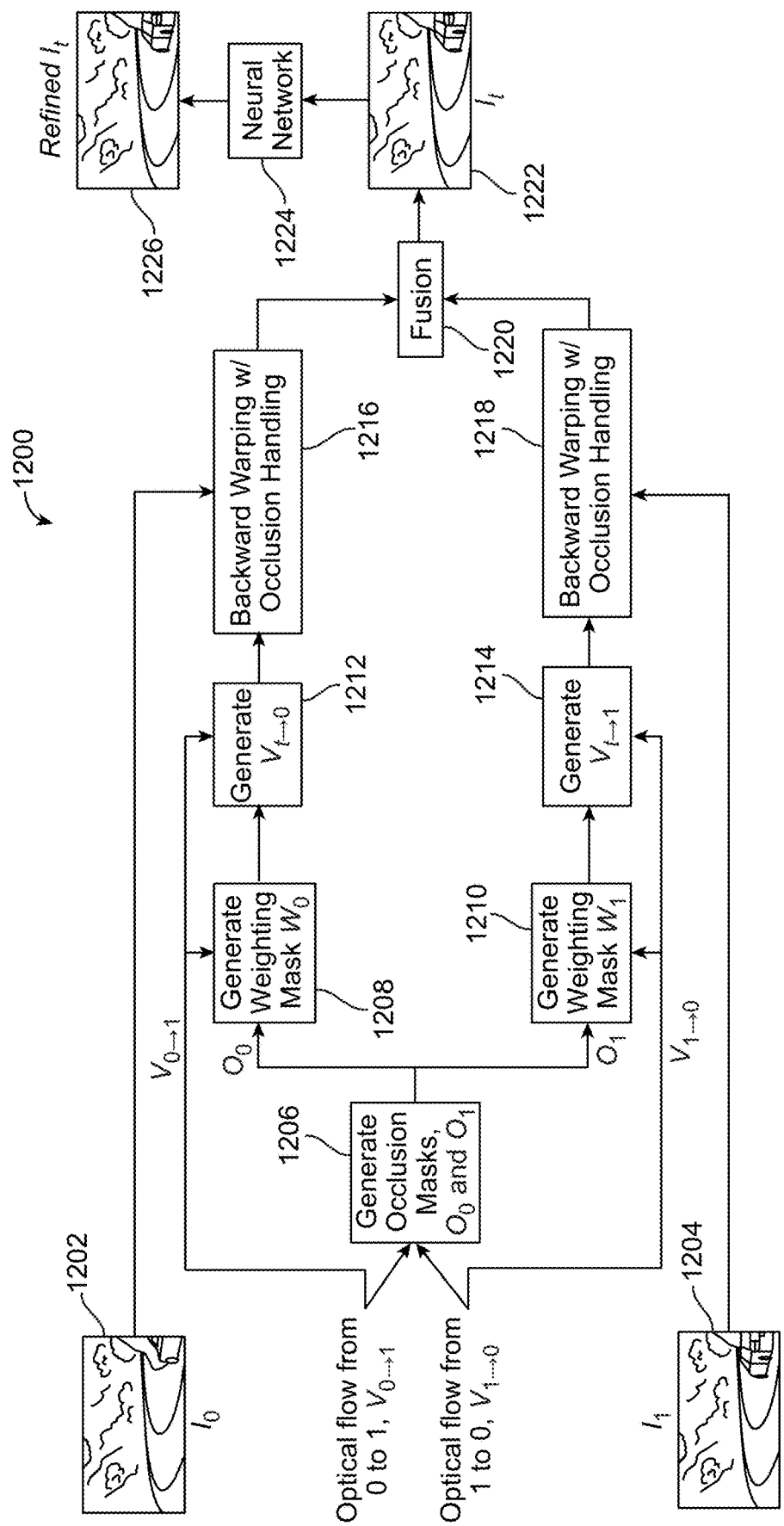
FIG. 12 illustrates an example process of performing video frame interpolation, in accordance with aspects of the present disclosure.

FIG. 12 illustrates an overall pipeline of a system 1200. The system 1200 receives as input a first frame $I_0$ 1202 and a second frame $I_1$ 1204. The optical flow from 0 to 1 and from 1 to 0 are estimated respectively as a first optical flow $V_{0 \to 1}$ and a second optical flow $V_{1 \to 0}$. The generation of the optical flows can be performed using software models such as a recurrent all-pairs field transforms (RAFT) or other model for estimating optical flow. An occlusion mask generator 1206 is used to generate the occlusion masks based on $V_{0 \to 1}$ and $V_{1 \to 0}$ to generate $O_0$ and $O_1$. As noted above, the occlusion mask generator 1206 can utilize a forward-backward consistency algorithm in the process of generating the occlusion masks.

The optical mask $O_0$ is provided to a first weighting mask generator 1208 that utilizes the optical mask $O_0$ and the first optical flow $V_{0 \to 1}$ to generate a first weighting mask $W_0$. The optical mask $O_1$ is provided to a second weighting mask generator 1210 that utilizes the optical mask $O_1$ and the optical flow $V_{1 \to 0}$ to generate a second weighting mask $W_1$.

A first optical flow generator 1212 generates, based on the first weighting mask $W_0$ and the first optical flow $V_{0 \to 1}$, an optical flow $V_{t \to 0}$. A second optical flow generator 1214 generates, based on the second weighting mask $W_1$ and the second optical flow $V_{0 \to 1}$, an optical flow $V_{t \to 1}$. The optical flow $V_{t \to 0}$ and the first frame $I_0$ 1202 are provided to a first backward warping with occlusion handling generator 1216 to generate a first backward warped image. The optical flow $V_{t \to 1}$ and the second frame $I_1$ 1204 are provided to a second backward warping with occlusion handling generator 1218 to generate a second backward warped image. The first backward warped image and the second backward warped image are provided to a fusion engine 1220 to fuse the data and generate an inter-frame $I_t$ 1222.

Optionally, the inter-frame $I_t$ 1222 can be further processed by a neural network 1224 which can be trained to enhance the inter-frame $I_t$ 1222. For example, the neural network 1224 can be trained based on training data with ground truth inter-frames $I_t$ to generate a refined inter-frame $I_t$ 1226.

In another aspect, there may be a part of the inter-frame 1222 in which there is low confidence in the data covering a region of the image. In such a case, the low-confidence region would be removed and the neural network 1224 could be used to fill in the removed region. Thus, there are several ways of refinement.

Figure 13:
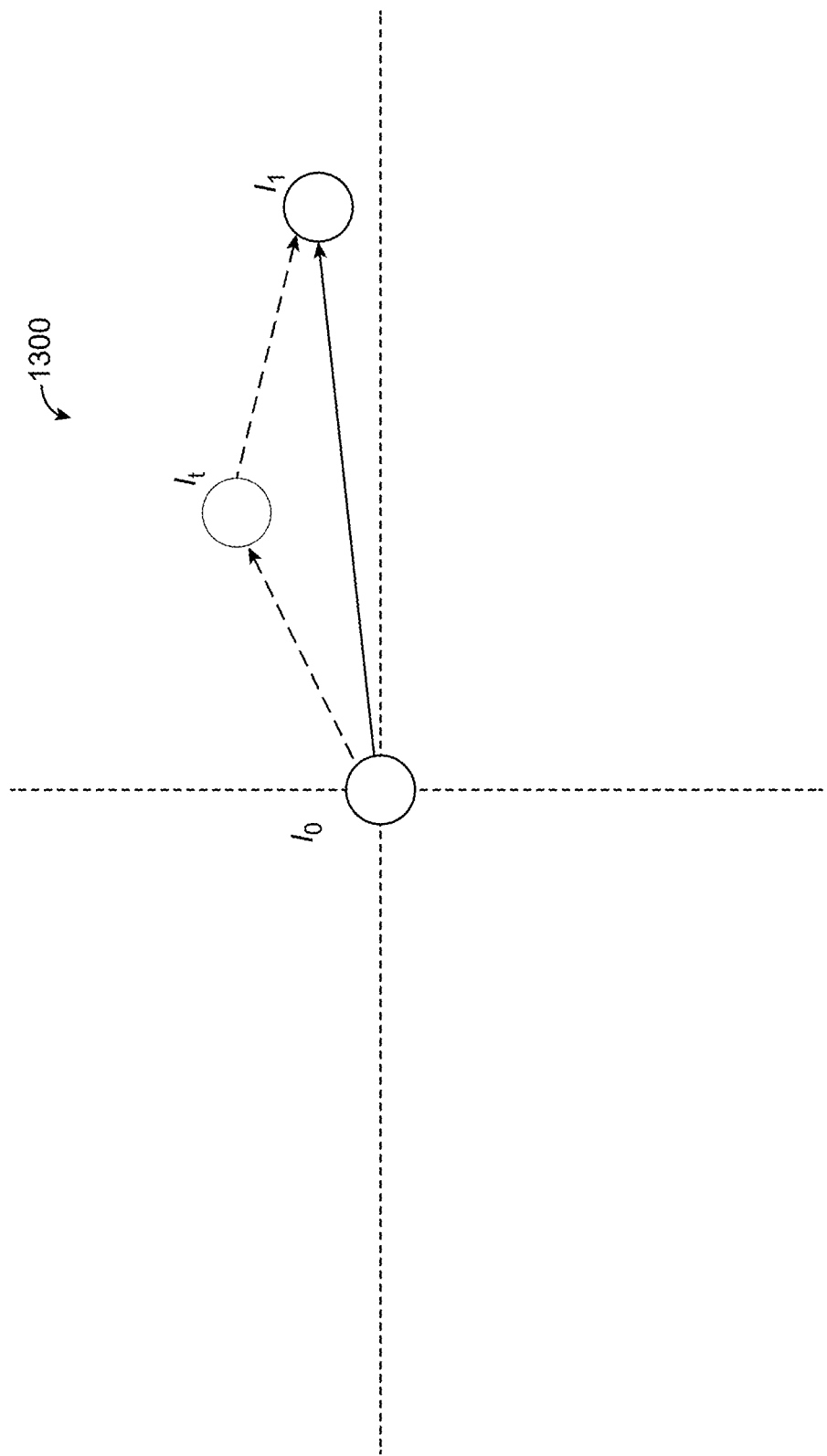
FIG. 13 illustrates a problem in which with two images, one cannot generate non-linear movement, in accordance with aspects of the present disclosure.

FIG. 13 illustrates a graph 1300 illustrating problem in which with two images $I_1$, $I_0$, one cannot generate non-linear movement represented by the inter-frame $I_t$, in accordance with aspects of the present disclosure. The movement may be characterized by a polynomial equation.

Figure 14:
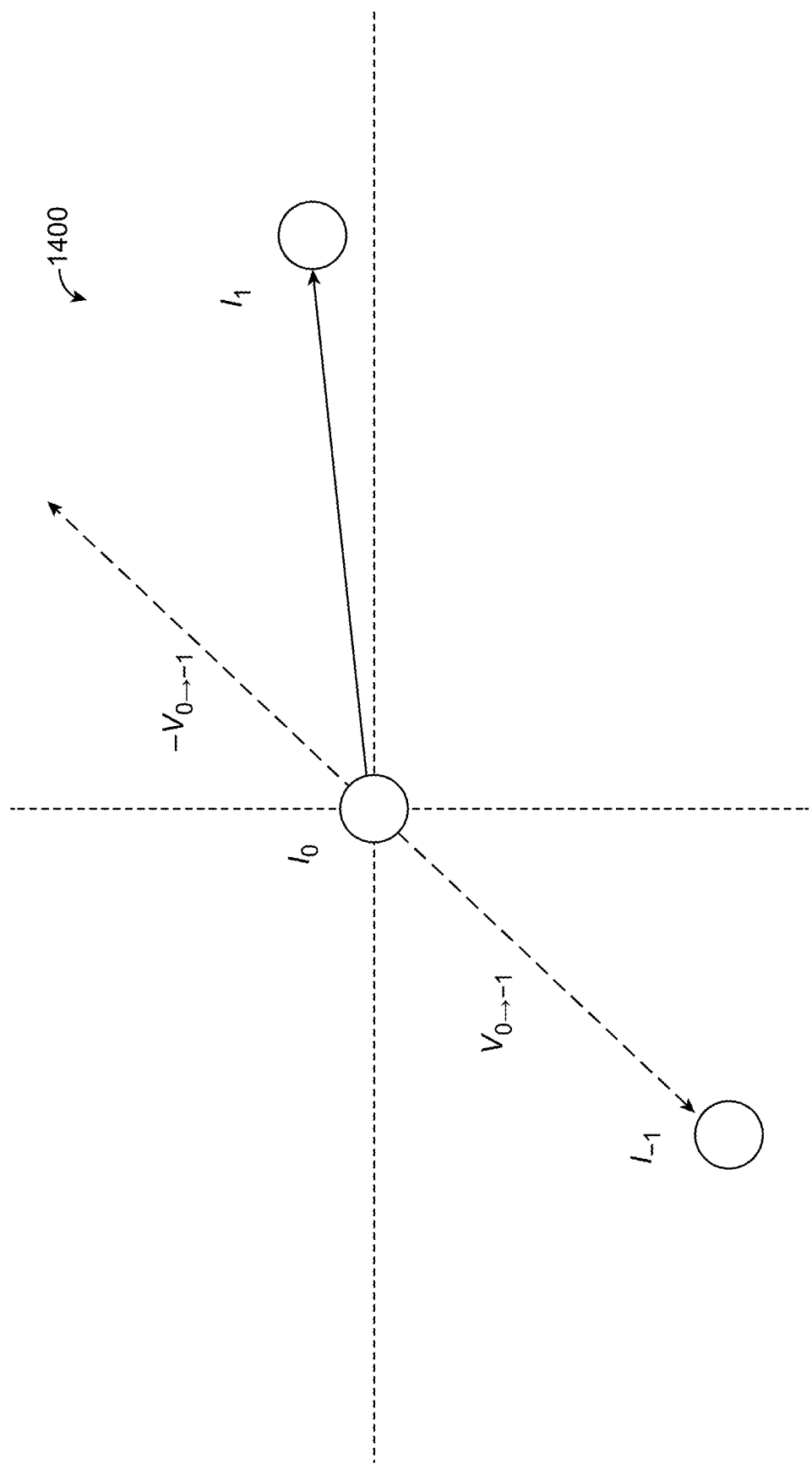
FIG. 14 illustrates quadratic video interpolation, in accordance with aspects of the present disclosure.

FIG. 14 illustrates a graph 1400 in which quadratic video interpolation is used to seek to address the issue of generating non-linear movement between two images $I_1$, $I_0$. The approach shown in FIG. 14 is outlined in Xu, Xiangyu, et al. "Quadratic video interpolation." Advances in Neural Information Processing Systems 32 (2019), incorporated herein by reference. The attempt to resolve the problem in FIG. 14 includes using a quadratic equation for determining the flow from time 0 to time 1 as:

$$v_{0 \to t} = (V_{0 \to 1} + V_{0 \to -1})/2 \times t^2 + (V_{0 \to 1} - V_{0 \to -1})/2 \times t$$

Here, as shown in FIG. 14, the first optical flow $V_{0 \to -1}$ is shown from $I_0$ to $L_1$ and the second optical flow-$V_{0 \to -1}$ is the inverse of the first optical flow $V_{0 \to -1}$. Using this equation, the system can learn from non-linear movement.

Figure 15:
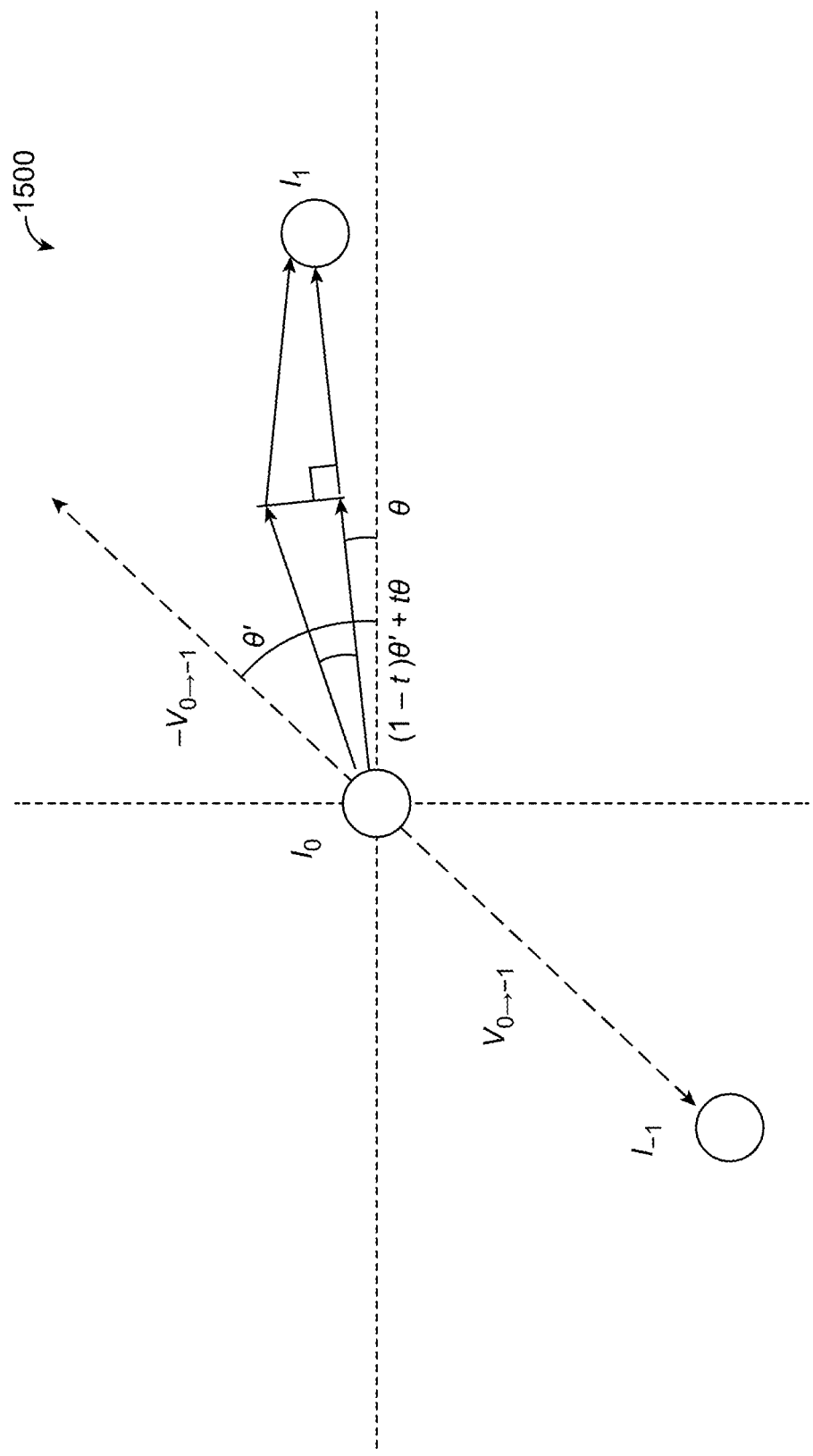
FIG. 15 illustrates an approach to video interpolation, in accordance with aspects of the present disclosure.

FIG. 15 illustrates a graph 1500 showing a desired set of data to be able to obtain $I_t$. Here, the problem is desirable to be cast as needing to determine the different angles Θ and Θ' and the difference between these angles to help determine the non-linear flow between the images.

Figure 16:
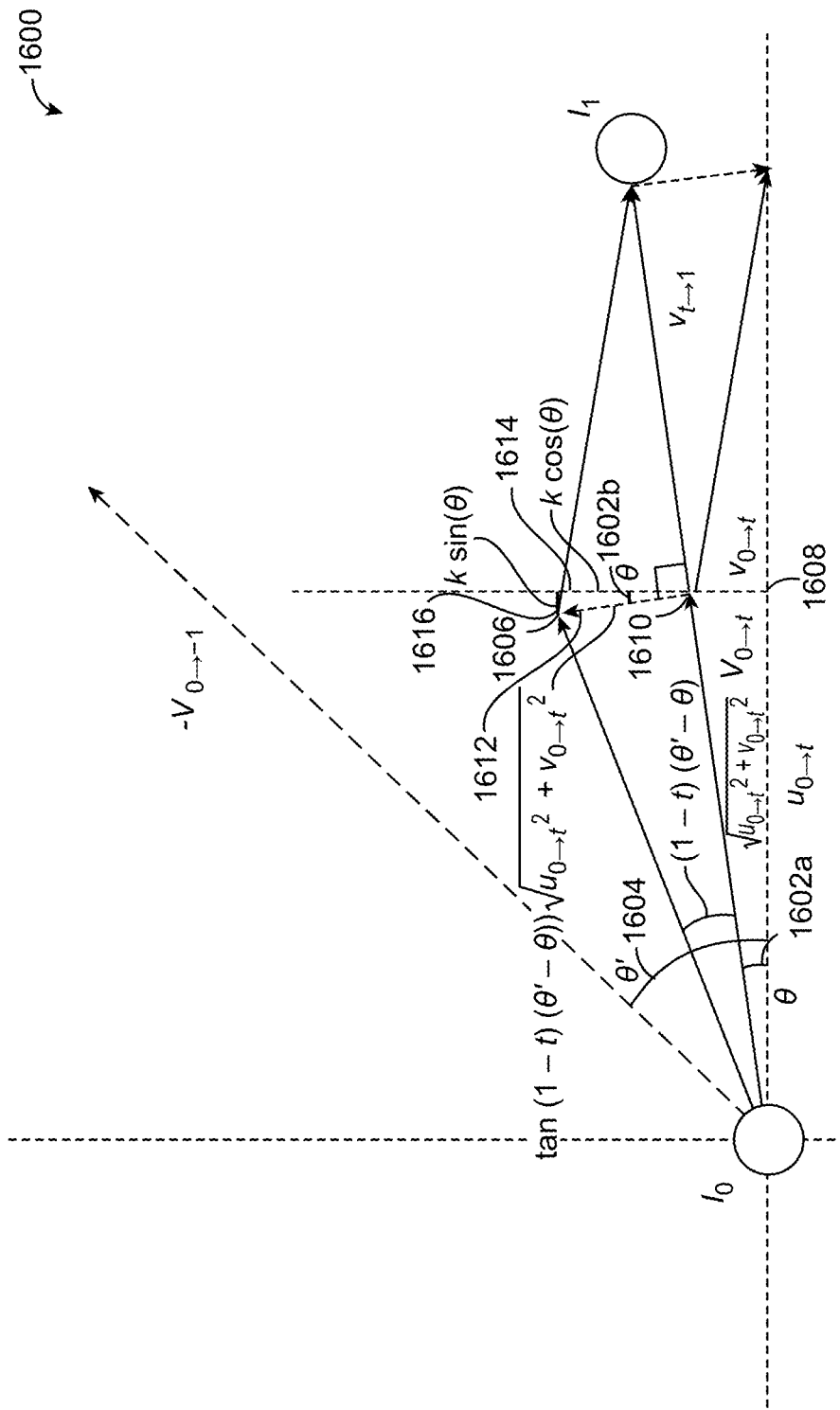
FIG. 16 illustrates a solution to video interpolation, in accordance with aspects of the present disclosure.

FIG. 16 illustrates a graph 1600 showing a solution to video interpolation. Here, the goal is to use the differences between the angles Θ 1602a and Θ' 1604 to determine the optical flow and the value for an inter-frame at a point 1606. A value $u_{0 \to t}$ represents a value along the x axis from $I_0$ to a point 1608. A value $v_{0 \to t}$ represents a y value from point 1608 to point 1610. Note that the angle Θ 1602a is equal to the angle Θ 1602b. If |θ'−θ|<Threshold, then the process can use the below equations to seek to determine the value at point 1606 of an inter-frame. This means that the difference between the angles Θ 1602a and Θ' 1604 should be below a certain threshold. As shown, $V_{0 \to t}(x)$ includes the x, y values of: [$u_{0 \to t}(x)$, $v_{0 \to t}(x)$]. Values for $V_{0 \to t}(x)' =>[u_{0 \to t}(x) - k \sin(\theta), v_{0 \to t}(x) + k \cos(\theta)]$ represent the revised x, y values for the position of the inter-frame $I_i$ at point 1606. In some aspects, $k=\tan((1-t)(\theta'-\theta))\sqrt{u_{0 \to t}^2 + v_{0 \to t}^2}$ which is the length of line 1612. The value of k cos (θ) represents the length of line 1614. The value of k sin (θ) represents the length of line 1616. The value of $V_{t \to 1}(x)$ includes [$u_{t \to 1}(x)$, $V_{t \to 1}(x)$] and $V_{t \to 1}(x)' =>[u_{t \to 1}(x) + k \sin(\theta), v_{0 \to t}(x) - k \cos(\theta)]$. The above-noted equations are used to determine the value of an inter-frame at point 1606 that is non-linear relative to the first frame $I_0$ and the second frame $I_1$.

When assuming linear motion, the following formulation can apply $V_{t \to 1}(x)=w_f((1-t)V_{0 \to 1}(x), tV_{0 \to 1})$, as previously described.

In the improved calculation where non-linear motion is assumed and multiple frames are used, the following can be applied: $V_{t \to 1}(x)=w_f(V_{0 \to 1}(x)-V_{0 \to t}(x)', V_{0 \to t}(x)')$, where $V_{0 \to t}(x)'$ is the estimated intermediate optical flow from 0 to t when multi-frame information is taken into account, as previously described.

Using the data obtained above, one can determine an optical flow using the revised optical non-linear optical flows as follows:

$$V_{0 \to 1}(x) = V_{0 \to t}(x)' + V_{t \to 1}(x + V_{0 \to t}(x)')'$$

$$\text{Or, } V_{t \to 1}(x) = w_f(V_{0 \to 1}(x) - V_{0 \to t}(x)', V_{0 \to t}(x)'),$$

Figure 17:
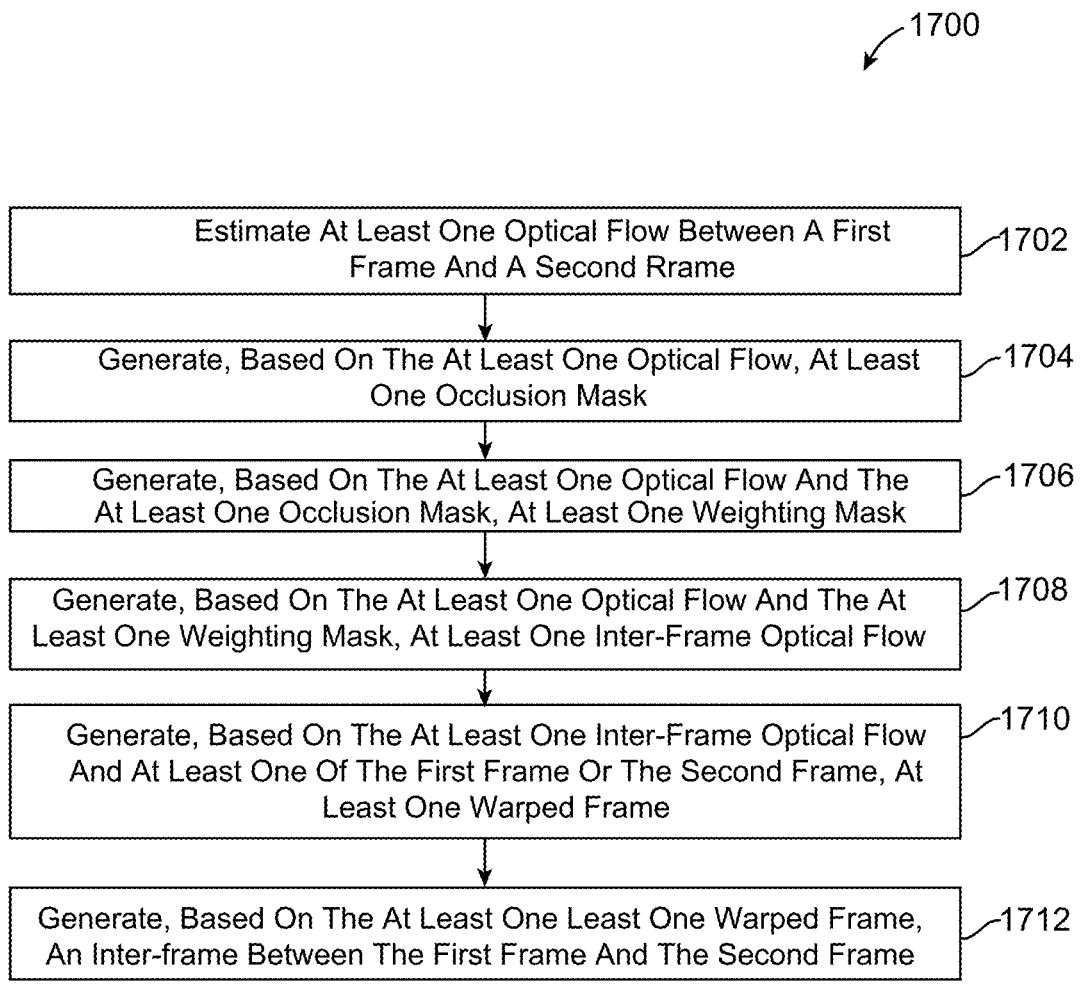
FIG. 17 illustrate a process for performing video frame interpolation, in accordance with aspects of the present disclosure.

FIG. 17 is a flowchart illustrating an example process 1700 for processing one or more frames of data to generate an inter-frame. The process 1700 can include any one or more of the steps disclosed herein. The process 1700 can be performed using a computing device (or apparatus) or a component or system (e.g., a chipset, one or more processors (e.g., one or more CPUs, GPUs, NPUs, DSPs, etc.) of the computing device. The computing device may include, for instance, the system 1200 for generating an inter-frame in FIG. 12 having an occlusion mask generator 1206, one or more weighting mask generators 1208, 1210, one or more optical flow generators 1212, 1214, one or more backward warping and occlusion handling generators 1216, 1218, a fusion engine 1220 and/or a neural network 1224, a computing system 2000, or a combination thereof.

At operation 1702, the computing device (or at least one component or system thereof) can estimate at least one optical flow between a first frame and a second frame. In some aspects, estimating the at least one optical flow between the first frame and the second frame can include estimating a first optical flow in a forward direction from the first frame to the second frame and estimating a second optical flow in a backward direction from the second frame to the first frame.

At operation 1704, the computing device (or at least one component or system thereof) can generate, based on the at least one optical flow, at least one occlusion mask. In some aspects, generating the at least one occlusion mask can include generating, based on the first optical flow and the second optical flow, a first occlusion mask and a second occlusion mask. The first occlusion mask and the second occlusion mask may be generated using an algorithm that determines forward-backward consistency between a forward optical flow and a backward optical flow.

At operation 1706, the computing device (or at least one component or system thereof) can generate, based on the at least one optical flow and the at least one occlusion mask, at least one weighting mask. In some aspects, generating the at least one weighting mask can further include generating, based on the first optical flow and the first occlusion mask, a first weighting mask and generating, based on the second optical flow and the second occlusion mask, a second weighting mask. In some aspects, the at least one weighting mask can include a weight value based on an occlusion value in the at least one occlusion mask.

At operation 1708, the computing device (or at least one component or system thereof) can generate, based on the at least one optical flow and the at least one weighting mask, at least one inter-frame optical flow. In some aspects, generating the at least one inter-frame optical flow further can include generating, based on the first optical flow and the first weighting mask, a first inter-frame optical flow in a first direction and generating, based on the second optical flow and the second weighting mask, a second inter-frame optical flow in a second direction.

At operation 1710, the computing device (or at least one component or system thereof) can generate, based on the at least one inter-frame optical flow and at least one of the first frame or the second frame, at least one warped frame.

In some aspects, to generate the at least one warped frame, the computing device (or at least one component or system thereof) can generate, based on the first frame and the first inter-frame optical flow in the first direction, a first warped frame and generating, based on the second frame and the second inter-frame optical flow in the second direction, a second warped frame.

At operation 1712, the computing device (or at least one component or system thereof) can generate, based on the at least one warped frame, an inter-frame between the first frame and the second frame.

In some aspects, the computing device (or at least one component or system thereof) can fuse a first warped frame and a second warped frame to generate the inter-frame. The computing device (or at least one component or system thereof) can is configured to and can apply a neural network to the inter-frame to generate a refined inter-frame. The neural network can be trained on training data with ground truth inter-frame.

In some aspects, an apparatus to process one or more frames includes one or more memories configured to store a first frame and a second frame; and one or more processors coupled to the one or more memories and configured to: estimate at least one optical flow between the first frame and the second frame; generate, based on the at least one optical flow, at least one occlusion mask; generate, based on the at least one optical flow and the at least one occlusion mask, at least one weighting mask; generate, based on the at least one optical flow and the at least one weighting mask, at least one inter-frame optical flow; generate, based on the at least one inter-frame optical flow and at least one of the first frame or the second frame, at least one warped frame; and generate, based on the at least one warped frame, an inter-frame between the first frame and the second frame.

In some aspects, a non-transitory computer-readable medium (e.g., memory 2015, ROM 2020, RAM 2025, or cache 2011 of FIG. 20) is provided having stored thereon instructions which, when executed by one or more processors (e.g., processor 2012), cause the one or more processors to be configured to: extract first prosody data from input data; generate a content embedding based on the input data; extract second prosody data from target speech; generate a speaker embedding from the target speech; generate a prosody embedding from the second prosody data; and generate, based on the first prosody data and the prosody embedding, converted prosody data.

In another aspect, an apparatus can include means for extracting first prosody data from input data; means for generating a content embedding based on the input data; means for extracting second prosody data from target speech; means for generating a speaker embedding from the target speech; means for generating a prosody embedding from the second prosody data; and means for generating, based on the first prosody data and the prosody embedding, converted prosody data. The means for performing any of the above functions can, in some cases, include the system 1200 for generating an inter-frame in FIG. 12 having an occlusion mask generator 1206, one or more weighting mask generators 1208, 1210, one or more optical flow generators 1212, 1214, one or more backward warping and occlusion handling generators 1216, 1218, a fusion engine 1220 and/or a neural network 1224, a computing system 2000, or a combination thereof.

The computing device can include any suitable device, such as a mobile device (e.g., a mobile phone), a desktop computing device, a tablet computing device, an XR device (e.g., a VR headset, an AR headset, AR glasses, etc.), a wearable device (e.g., a network-connected watch or smartwatch, or other wearable device), a server computer, a vehicle (e.g., an autonomous vehicle) or computing device of the vehicle, a robotic device, a laptop computer, a smart television, a camera, and/or any other computing device with the resource capabilities to perform the processes described herein, including the process 1700 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1700 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1700 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 18:
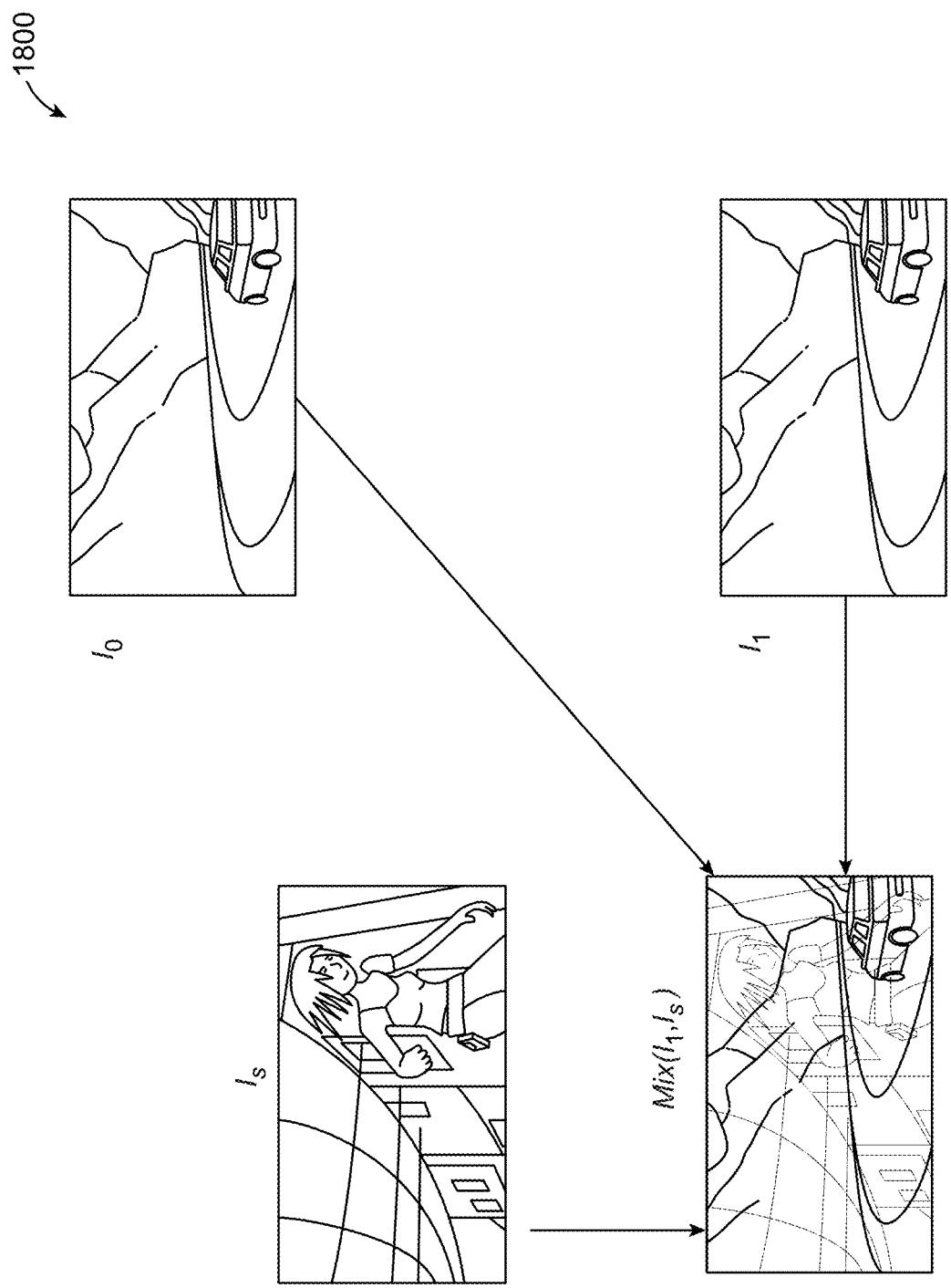
FIG. 18 illustrates a solution for generating optical flows and an intermediate frame given any t value in between, in accordance with aspects of the present disclosure.

FIG. 18 is a diagram 1800 illustrating a system for augmenting a training pair of frames by combining the image content of one frame with another image.

Figure 19:
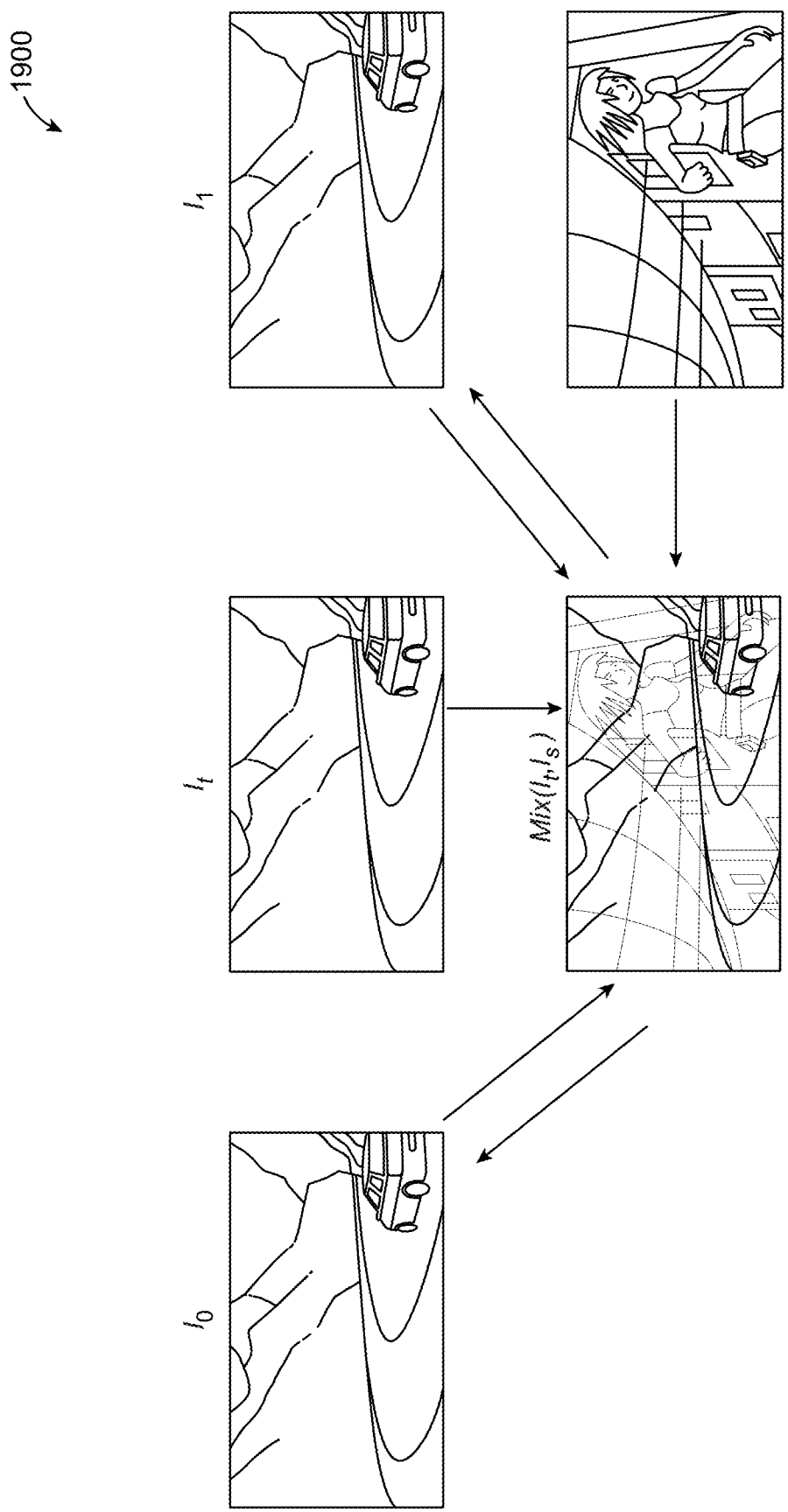
FIG. 19 illustrates a solution for generating optical flows and an intermediate frame given several pairs of images and a distracted image, in accordance with aspects of the present disclosure.

FIG. 19 illustrates an approach to training an optical flow network with several pairs of data and a distracted image 1900. By using the frame interpolation approach described herein, the approach can generate an interpolated middle frame, denoted as $I_t$, between a given pair of consecutive frames, $I_0$ and $I_1$, as well as the optical flow maps between the original frames and the middle frame, i.e., ($V_{0 \to t}$, $V_{t \to 1}$, $V_{1 \to t}$, $V_{1 \to 0}$). Such interpolated middle frames $I_t$ can be used to significantly augment the training data without requiring manual annotations. The new training pipeline can leverage data augmentation techniques. The approach illustrated in FIG. 19 involves generating four different pairs for each synthesized interframe to train the optical flow model. The approach can then further distract one of the frames with $I_s$, which is the distraction image as shown in FIG. 19. The approach includes applying the following processes, which now provides four augmented training pairs in addition to the original pair (note that by varying t, even more augmented samples can be generated):

$$(I_0, \text{Mix}(I_t, I_s), V_{0 \to t})$$
$$(\text{Mix}(I_t, I_s), I_0, V_{t \to 0})$$
$$(I_1, \text{Mix}(I_t, I_s), V_{1 \to t})$$
$$(\text{Mix}(I_t, I_s), I_1, V_{t \to 1})$$

Figure 20:
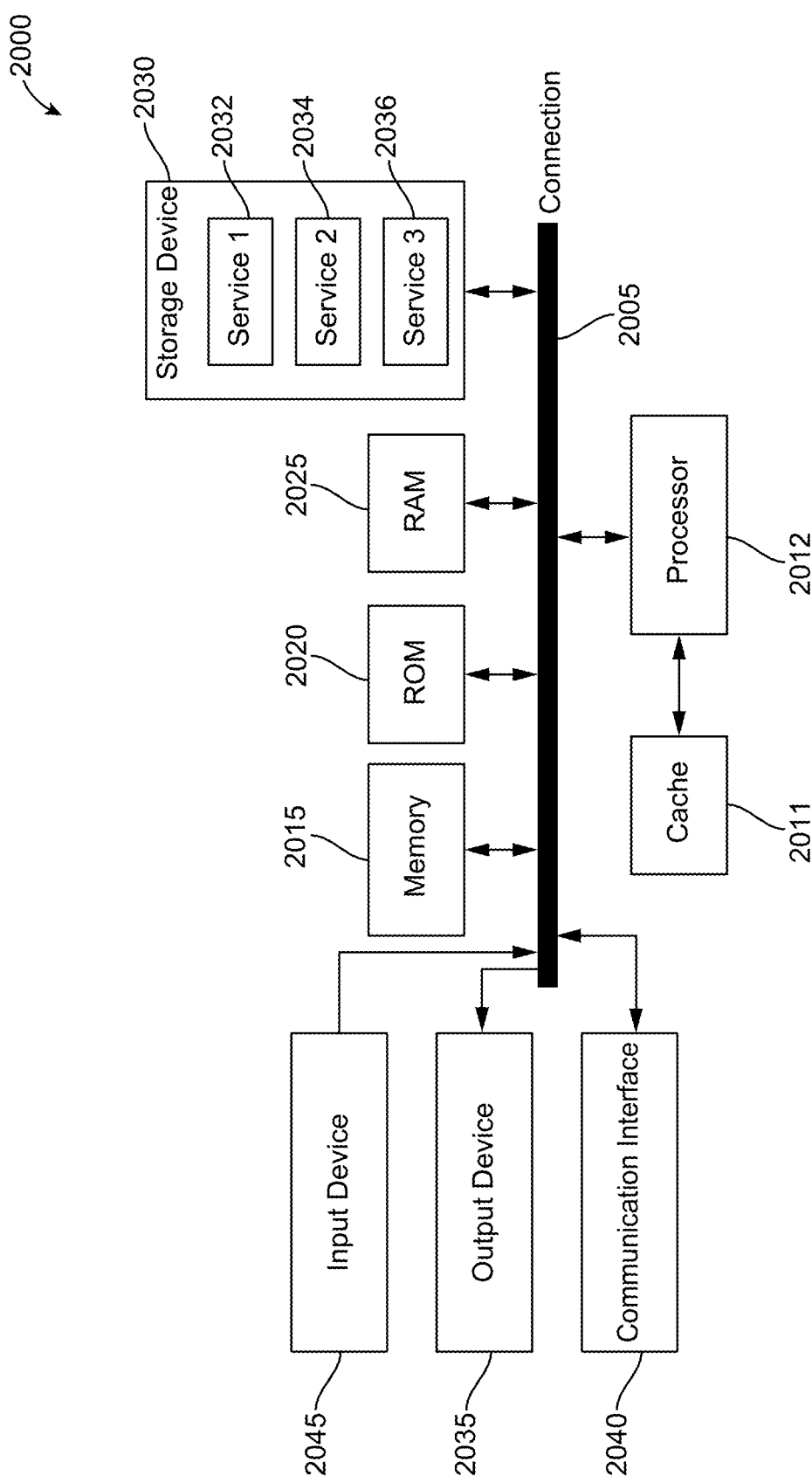
FIG. 20 illustrates an example computing system, in accordance with aspects of the present disclosure.

FIG. 20 is a diagram illustrating an example of a system for implementing certain aspects of the present disclosure. In particular, FIG. 20 illustrates an example of computing system 2000, which can be for example any computing device making up a computing system, a camera system, or any component thereof in which the components of the system are in communication with each other using connection 2005. Connection 2005 can be a physical connection using a bus, or a direct connection into processor 2012, such as in a chipset architecture. Connection 2005 can also be a virtual connection, networked connection, or logical connection.

In some examples, computing system 2000 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 2000 includes at least one processing unit (CPU or processor) 2012 and connection 2005 that couples various system components including system memory 2015, such as read-only memory (ROM) 2020 and random access memory (RAM) 2025 to processor 2012. Computing system 2000 can include a cache 2011 of high-speed memory connected directly with, in close proximity to, or integrated as part of processor 2012.

Processor 2012 can include any general purpose processor and a hardware service or software service, such as services 2032, 2034, and 2036 stored in storage device 2030, configured to control processor 2012 as well as a special-purpose processor where software instructions are incorporated into the actual processor design. Processor 2012 may essentially be a completely self-contained computing system, containing multiple cores or processors, a bus, memory controller, cache, etc. A multi-core processor may be symmetric or asymmetric.

To enable user interaction, computing system 2000 includes an input device 2045, which can represent any number of input mechanisms, such as a microphone for speech, a touch-sensitive screen for gesture or graphical input, keyboard, mouse, motion input, speech, etc. Computing system 2000 can also include output device 2035, which can be one or more of a number of output mechanisms. In some instances, multimodal systems can enable a user to provide multiple types of input/output to communicate with computing system 2000. Computing system 2000 can include communications interface 2040, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 2040 may also include one or more Global Navigation Satellite System (GNSS) receivers or transceivers that are used to determine a location of the computing system 2000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re- RAM), phase change memory (PCM), spin transfer torque RAM (STT-RAM), another memory chip or cartridge, and/or a combination thereof.

The storage device 2030 can include software services, servers, services, etc., that when the code that defines such software is executed by the processor 2012, the code causes the system to perform a function. In some examples, a hardware service that performs a particular function can include the software component stored in a computer-readable medium in connection with the necessary hardware components, such as processor 2012, connection 2005, output device 2035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1. An apparatus to process one or more frames, the apparatus comprising: one or more memories configured to store a first frame and a second frame; and one or more processors coupled to the one or more memories and configured to: estimate at least one optical flow between the first frame and the second frame; generate, based on the at least one optical flow, at least one occlusion mask; generate, based on the at least one optical flow and the at least one occlusion mask, at least one weighting mask; generate, based on the at least one optical flow and the at least one weighting mask, at least one inter-frame optical flow; generate, based on the at least one inter-frame optical flow and at least one of the first frame or the second frame, at least one warped frame; and generate, based on the at least one warped frame, an inter-frame between the first frame and the second frame.

Aspect 2. The apparatus of Aspect 1, wherein the one or more processors coupled to the one or more memories are configured to estimate the at least one optical flow between the first frame and the second frame by: estimating a first optical flow in a forward direction from the first frame to the second frame; and estimating a second optical flow in a backward direction from the second frame to the first frame.

Aspect 3. The apparatus of Aspect 2, wherein the one or more processors coupled to the one or more memories are configured to generate the at least one occlusion mask by: generating, based on the first optical flow and the second optical flow, a first occlusion mask and a second occlusion mask.

Aspect 4. The apparatus of Aspect 3, wherein the first occlusion mask and the second occlusion mask are generated using forward-backward consistency.

Aspect 5. The apparatus of any one of Aspects 3 or 4, wherein the one or more processors coupled to the one or more memories are configured to generate the at least one weighting mask by: generating, based on the first optical flow and the first occlusion mask, a first weighting mask; and generating, based on the second optical flow and the second occlusion mask, a second weighting mask.

Aspect 6. The apparatus of Aspect 5, wherein the one or more processors coupled to the one or more memories are configured to generate the at least one inter-frame optical flow by: generating, based on the first optical flow and the first weighting mask, a first inter-frame optical flow in a first direction; and generating, based on the second optical flow and the second weighting mask, a second inter-frame optical flow in a second direction.

Aspect 7. The apparatus of Aspect 6, wherein the one or more processors coupled to the one or more memories are configured to generate the at least one warped frame by: generating, based on the first frame and the first inter-frame optical flow in the first direction, a first warped frame; and generating, based on the second frame and the second inter-frame optical flow in the second direction, a second warped frame.

Aspect 8. The apparatus of Aspect 7, wherein the one or more processors coupled to the one or more memories are configured to: fuse the first warped frame and the second warped frame to generate the inter-frame.

Aspect 9. The apparatus of any one of Aspects 1 to 8, wherein the one or more processors coupled to the one or more memories are configured to: apply a neural network to the inter-frame to generate a refined inter-frame.

Aspect 10. The apparatus of Aspect 9, wherein the neural network is trained on training data with one or more ground truth inter-frame and one or more optical flow maps generated using the neural network.

Aspect 11. The apparatus of any one of Aspects 1 to 10, wherein the at least one weighting mask includes a weight value based on an occlusion value in the at least one occlusion mask.

Aspect 12. A method of processing one or more frames, the method comprising: estimating at least one optical flow between a first frame and a second frame; generating, based on the at least one optical flow, at least one occlusion mask; generating, based on the at least one optical flow and the at least one occlusion mask, at least one weighting mask; generating, based on the at least one optical flow and the at least one weighting mask, at least one inter-frame optical flow; generating, based on the at least one inter-frame optical flow and at least one of the first frame or the second frame, at least one warped frame; and generating, based on the at least one warped frame, an inter-frame between the first frame and the second frame.

Aspect 13. The method of Aspect 12, wherein estimating the at least one optical flow between the first frame and the second frame comprises: estimating a first optical flow in a forward direction from the first frame to the second frame; and estimating a second optical flow in a backward direction from the second frame to the first frame.

Aspect 14. The method of Aspect 13, wherein generating the at least one occlusion mask: generating, based on the first optical flow and the second optical flow, a first occlusion mask and a second occlusion mask.

Aspect 15. The method of Aspect 14, wherein the first occlusion mask and the second occlusion mask are generated using forward-backward consistency.

Aspect 16. The method of any one of Aspects 14 or 15, wherein generating the at least one weighting mask comprises: generating, based on the first optical flow and the first occlusion mask, a first weighting mask; and generating, based on the second optical flow and the second occlusion mask, a second weighting mask.

Aspect 17. The method of Aspect 16, wherein generating the at least one inter-frame optical flow comprises: generating, based on the first optical flow and the first weighting mask, a first inter-frame optical flow in a first direction; and generating, based on the second optical flow and the second weighting mask, a second inter-frame optical flow in a second direction.

Aspect 18. The method of Aspect 17, wherein generating the at least one warped frame comprises: generating, based on the first frame and the first inter-frame optical flow in the first direction, a first warped frame; and generating, based on the second frame and the second inter-frame optical flow in the second direction, a second warped frame.

Aspect 19. The method of Aspect 18, further comprising: fusing the first warped frame and the second warped frame to generate the inter-frame.

Aspect 20. The method of any one of Aspects 12 to 19, further comprising: applying a neural network to the inter-frame to generate a refined inter-frame.

Aspect 21. The method of Aspect 20, wherein the neural network is trained on training data with one or more ground truth inter-frame and one or more optical flow maps generated using the neural network.

Aspect 22. The method of any one of Aspects 12 to 21, wherein the at least one weighting mask includes a weight value based on an occlusion value in the at least one occlusion mask.

Aspect 23. A non-transitory computer-readable medium having stored thereon instructions which, when executed by one or more processors, cause the one or more processors to be configured to: estimate at least one optical flow between the first frame and the second frame; generate, based on the at least one optical flow, at least one occlusion mask; generate, based on the at least one optical flow and the at least one occlusion mask, at least one weighting mask; generate, based on the at least one optical flow and the at least one weighting mask, at least one inter-frame optical flow; generate, based on the at least one inter-frame optical flow and at least one of the first frame or the second frame, at least one warped frame; and generate, based on the at least one warped frame, an inter-frame between the first frame and the second frame.

Aspect 24. The non-transitory computer-readable medium of Aspect 23, wherein the instructions, when executed by the one or more processors, cause the one or more processors to perform operations according to any of Aspects 12 to 22.

Aspect 25. An apparatus comprising: means for estimating at least one optical flow between a first frame and a second frame; means for generating, based on the at least one optical flow, at least one occlusion mask; means for generating, based on the at least one optical flow and the at least one occlusion mask, at least one weighting mask; means for generating, based on the at least one optical flow and the at least one weighting mask, at least one inter-frame optical flow; means for generating, based on the at least one inter-frame optical flow and at least one of the first frame or the second frame, at least one warped frame; and means for generating, based on the at least one warped frame, an inter-frame between the first frame and the second frame.

Aspect 26. The apparatus of Aspect 25, further comprising one or more means for performing operations according to any of Aspects 12 to 22.

What is claimed is:

1. An apparatus to process one or more frames, the apparatus comprising:
   one or more memories configured to store a first frame and a second frame; and
   one or more processors coupled to the one or more memories and configured to:
   estimate at least one optical flow between the first frame and the second frame;
   generate, based on the at least one optical flow, at least one occlusion mask;
   generate, based on the at least one optical flow and the at least one occlusion mask, at least one weighting mask;
   generate, based on the at least one optical flow and the at least one weighting mask, at least one inter-frame optical flow;
   generate, based on the at least one inter-frame optical flow and at least one of the first frame or the second frame, at least one warped frame; and
   generate, based on the at least one warped frame, an inter-frame between the first frame and the second frame;
   wherein the one or more processors coupled to the one or more memories are configured to generate the at least one occlusion mask by generating, based on the first optical flow and the second optical flow, a first occlusion mask and a second occlusion mask; and
   wherein the one or more processors coupled to the one or more memories are configured to generate the at least one weighting mask by:
   generating, based on the first optical flow and the first occlusion mask, a first weighting mask; and
   generating, based on the second optical flow and the second occlusion mask, a second weighting mask.

2. The apparatus of claim 1, wherein the one or more processors coupled to the one or more memories are configured to estimate the at least one optical flow between the first frame and the second frame by:
   estimating a first optical flow in a forward direction from the first frame to the second frame; and
   estimating a second optical flow in a backward direction from the second frame to the first frame.

3. The apparatus of claim 1, wherein the first occlusion mask and the second occlusion mask are generated using forward-backward consistency.

4. The apparatus of claim 1, wherein the one or more processors coupled to the one or more memories are configured to generate the at least one inter-frame optical flow by:
   generating, based on the first optical flow and the first weighting mask, a first inter-frame optical flow in a first direction; and
   generating, based on the second optical flow and the second weighting mask, a second inter-frame optical flow in a second direction.

5. The apparatus of claim 4, wherein the one or more processors coupled to the one or more memories are configured to generate the at least one warped frame by:
   generating, based on the first frame and the first inter-frame optical flow in the first direction, a first warped frame; and
   generating, based on the second frame and the second inter-frame optical flow in the second direction, a second warped frame.

6. The apparatus of claim 5, wherein the one or more processors coupled to the one or more memories are configured to:
   fuse the first warped frame and the second warped frame to generate the inter-frame.

7. The apparatus of claim 1, wherein the one or more processors coupled to the one or more memories are configured to:
apply a neural network to the inter-frame to generate a refined inter-frame.

8. The apparatus of claim 7, wherein the neural network is trained on training data with one or more ground truth inter-frame and one or more optical flow maps generated using the neural network.

9. The apparatus of claim 1, wherein the at least one weighting mask includes a weight value based on an occlusion value in the at least one occlusion mask.

10. A method of processing one or more frames, the method comprising:
estimating at least one optical flow between a first frame and a second frame;
generating, based on the at least one optical flow, at least one occlusion mask;
generating, based on the at least one optical flow and the at least one occlusion mask, at least one weighting mask;
generating, based on the at least one optical flow and the at least one weighting mask, at least one inter-frame optical flow;
generating, based on the at least one inter-frame optical flow and at least one of the first frame or the second frame, at least one warped frame; and
generating, based on the at least one warped frame, an inter-frame between the first frame and the second frame;
wherein generating the at least one occlusion mask comprises generating, based on the first optical flow and the second optical flow, a first occlusion mask and a second occlusion mask; and
wherein generating the at least one weighting mask comprises:
generating, based on the first optical flow and the first occlusion mask, a first weighting mask; and
generating, based on the second optical flow and the second occlusion mask, a second weighting mask.

11. The method of claim 10, wherein estimating the at least one optical flow between the first frame and the second frame comprises:
estimating a first optical flow in a forward direction from the first frame to the second frame; and
estimating a second optical flow in a backward direction from the second frame to the first frame.

12. The method of claim 10, wherein the first occlusion mask and the second occlusion mask are generated using forward-backward consistency.

13. The method of claim 10, wherein generating the at least one inter-frame optical flow comprises:
generating, based on the first optical flow and the first weighting mask, a first inter-frame optical flow in a first direction; and
generating, based on the second optical flow and the second weighting mask, a second inter-frame optical flow in a second direction.

14. The method of claim 13, wherein generating the at least one warped frame comprises:
generating, based on the first frame and the first inter-frame optical flow in the first direction, a first warped frame; and
generating, based on the second frame and the second inter-frame optical flow in the second direction, a second warped frame.

15. The method of claim 14, further comprising:
fusing the first warped frame and the second warped frame to generate the inter-frame.

16. The method of claim 10, further comprising:
applying a neural network to the inter-frame to generate a refined inter-frame.

17. The method of claim 16, wherein the neural network is trained on training data with one or more ground truth inter-frame and one or more optical flow maps generated using the neural network.

18. The method of claim 10, wherein the at least one weighting mask includes a weight value based on an occlusion value in the at least one occlusion mask.

19. A non-transitory computer-readable medium having stored thereon instructions which, when executed by one or more processors, cause the one or more processors to be configured to:
estimate at least one optical flow between the first frame and the second frame;
generate, based on the at least one optical flow, at least one occlusion mask;
generate, based on the at least one optical flow and the at least one occlusion mask, at least one weighting mask;
generate, based on the at least one optical flow and the at least one weighting mask, at least one inter-frame optical flow;
generate, based on the at least one inter-frame optical flow and at least one of the first frame or the second frame, at least one warped frame; and
generate, based on the at least one warped frame, an inter-frame between the first frame and the second frame;
wherein to generate the at least one occlusion mask by generating, based on the first optical flow and the second optical flow, a first occlusion mask and a second occlusion mask; and
wherein to generate the at least one weighting mask by:
generating, based on the first optical flow and the first occlusion mask, a first weighting mask; and
generating, based on the second optical flow and the second occlusion mask, a second weighting mask.

20. An apparatus comprising:
means for estimating at least one optical flow between a first frame and a second frame;
means for generating, based on the at least one optical flow, at least one occlusion mask;
means for generating, based on the at least one optical flow and the at least one occlusion mask, at least one weighting mask;
means for generating, based on the at least one optical flow and the at least one weighting mask, at least one inter-frame optical flow;
means for generating, based on the at least one inter-frame optical flow and at least one of the first frame or the second frame, at least one warped frame; and
means for generating, based on the at least one warped frame, an inter-frame between the first frame and the second frame;
wherein means for generating the at least one occlusion mask comprises means for generating, based on the first optical flow and the second optical flow, a first occlusion mask and a second occlusion mask; and
wherein means for generating the at least one weighting mask comprises:

means for generating, based on the first optical flow and the first occlusion mask, a first weighting mask; and means for generating, based on the second optical flow and the second occlusion mask, a second weighting mask.

* * * * *